United States Patent
Sato et al.

(10) Patent No.: US 9,749,517 B2
(45) Date of Patent: Aug. 29, 2017

(54) IMAGE PICKUP SYSTEM AND IMAGE PICKUP METHOD

(71) Applicant: OLYMPUS CORPORATION, Shibuya-ku, Tokyo (JP)

(72) Inventors: Akinobu Sato, Hachioji (JP); Yoshihiro Yokomae, Higashiyamato (JP); Koji Sakai, Mitaka (JP); Keito Fukushima, Mitaka (JP)

(73) Assignee: OLYMPUS CORPORATION, Tokyo (JP)

( * ) Notice: Subject to any disclaimer, the term of this patent is extended or adjusted under 35 U.S.C. 154(b) by 92 days.

(21) Appl. No.: 14/705,562

(22) Filed: May 6, 2015

(65) Prior Publication Data

US 2015/0381887 A1    Dec. 31, 2015

(30) Foreign Application Priority Data

Jun. 25, 2014   (JP) .................................. 2014-130624

(51) Int. Cl.
| | |
|---|---|
| *H04N 5/225* | (2006.01) |
| *H04N 5/228* | (2006.01) |
| *H04N 5/232* | (2006.01) |

(52) U.S. Cl.
CPC ......... *H04N 5/23209* (2013.01); *H04N 5/232* (2013.01); *H04N 5/23258* (2013.01)

(58) Field of Classification Search
CPC . H04N 5/23209; H04N 5/23258; H04N 5/232
See application file for complete search history.

(56) References Cited

U.S. PATENT DOCUMENTS

| | | | | |
|---|---|---|---|---|
| 2009/0251548 A1* | 10/2009 | Honjo | ...................... | G03B 5/00 348/208.4 |
| 2009/0295931 A1* | 12/2009 | Cho | ...................... | H04N 5/2257 348/220.1 |
| 2012/0026346 A1* | 2/2012 | Lee | ...................... | H04N 5/23222 348/208.1 |
| 2013/0088607 A1* | 4/2013 | Akutsu | .................. | G03B 17/14 348/208.1 |
| 2013/0163973 A1* | 6/2013 | Tanaka | ...................... | G03B 5/00 396/55 |
| 2014/0160304 A1* | 6/2014 | Galor | ...................... | H04N 5/232 348/207.1 |

(Continued)

FOREIGN PATENT DOCUMENTS

JP    2007-312097 A    11/2007

*Primary Examiner* — Lin Ye
*Assistant Examiner* — John H Morehead, III
(74) *Attorney, Agent, or Firm* — Volpe and Koenig, P.C.

(57) ABSTRACT

An image pickup system includes an image pickup unit and a confirmation unit that displays a picked-up image transmitted from the image pickup unit, the image pickup unit and the confirmation unit being separable from each other, and the image pickup system is provided with: a first motion determination section that determines a motion of the image pickup unit; and a control section that instructs the image pickup unit to perform continuous shooting based on a determination result by the first motion determination section when the image pickup unit and the confirmation unit are separated from each other, which enables photographing without missing a photo opportunity.

13 Claims, 16 Drawing Sheets

(56) References Cited

U.S. PATENT DOCUMENTS

| | | | |
|---|---|---|---|
| 2014/0188989 A1* | 7/2014 | Stekkelpak | H04L 67/02 709/204 |
| 2015/0172531 A1* | 6/2015 | Ikeda | H04N 5/23206 348/207.11 |
| 2015/0381879 A1* | 12/2015 | Sato | G06T 7/20 348/207.11 |
| 2016/0156838 A1* | 6/2016 | Cheng | H04N 5/23219 348/222.1 |

\* cited by examiner

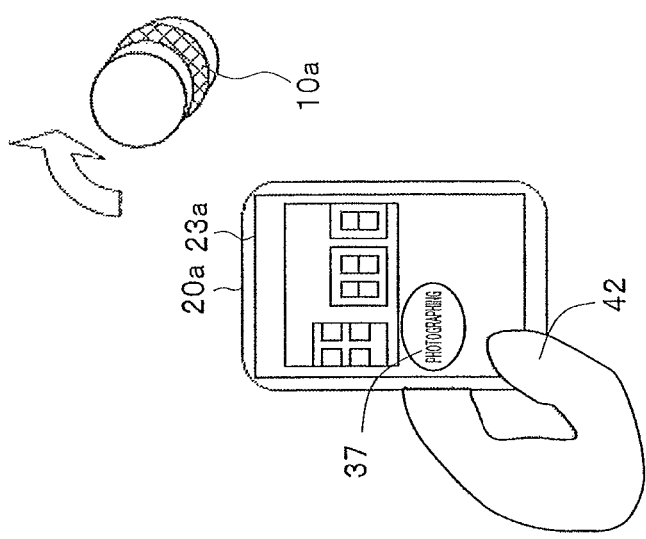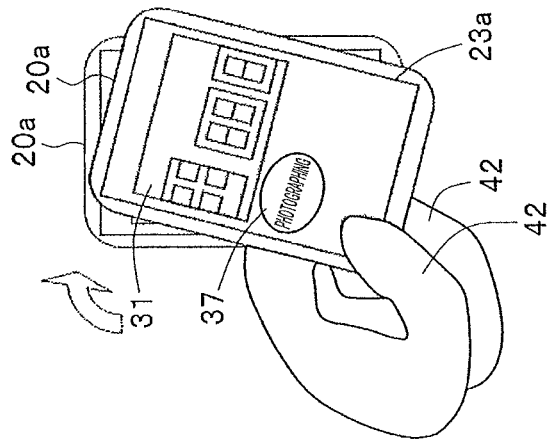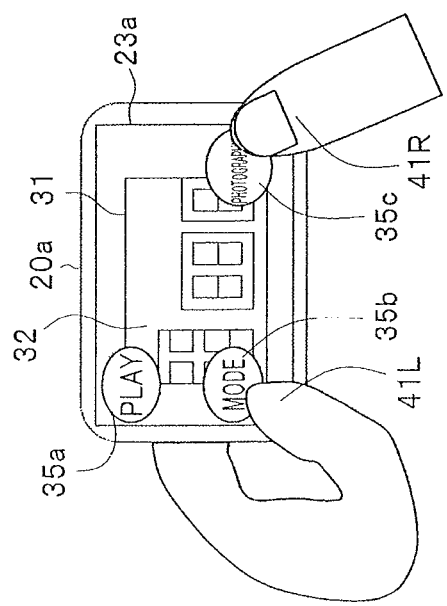

LENS-STYLE CAMERA

SMARTPHONE

IMAGE PICKUP SYSTEM AND IMAGE PICKUP METHOD

This application claims the benefit of Japanese Application No. 2014-130624 filed in Japan on Jun. 25, 2014, the entire contents of which are incorporated by this reference.

BACKGROUND OF THE INVENTION

Field of the Invention

The present invention relates to an image pickup system including a confirmation unit on which an image from a separated image pickup unit can be displayed, and an image pickup method.

Description of Related Art

In recent years, mobile devices with a photographing function (photographing devices) such as digital cameras have become common. Some of such photographing devices have a display section and a function for displaying a photographed image on the display section. In addition, some of them display a menu screen on a display section to facilitate the operation of the photographing devices. Such a display section is commonly provided on a rear surface of a mobile device main body, and a user is able to perform a photographing operation while confirming a through image displayed on the display section on the rear surface at the time of photographing.

Furthermore, various kinds of image processing apparatuses that process picked-up images have been developed, and Japanese Patent Application Laid-Open Publication No. 2007-312097, for example, discloses an image processing apparatus that enables a user to easily select a desired image from among continuously picked-up images, and the image processing apparatus selects an image in which a partial area selected by a user is focused on from among a plurality of images included in an image group classified by an image classification section.

Incidentally, in recent years, lens-style cameras, which do not have a display section for displaying a picked-up image but only have functions of photographing and recording, have sometimes been employed. Lens-style cameras of this type are generally attached to a smartphone, a tablet PC, or the like, and photographing is controlled by using the smartphone, tablet PC, or the like to which the lens-style camera is attached, as an operation device (control device). In addition, the control device such as a smartphone, tablet PC, or the like also functions as an image pickup display apparatus that displays a picked-up image from the lens-style camera.

Such a lens-style camera is attachable to and detachable from a smartphone, tablet PC, or the like, and is capable of photographing in a state detached from the smartphone, tablet PC, or the like. In this case, the control device such as the smartphone, tablet PC, or the like is connected to the lens-style camera by wireless or wire communication, and the photographing operation of the lens-style camera can be performed by using a touch panel, etc., provided on the display section.

Note that the lens-style camera is used in a state attached to the image pickup display apparatus that displays a picked-up image from the lens-style camera (connected state) in some cases, and used in a state detached from the image pickup display apparatus (separated state) in other cases. The lens-style camera in the separated state has an advantage in that a degree of freedom of a composition is more increased than in the connected state.

SUMMARY OF THE INVENTION

An image pickup system according to the present invention is an image pickup system which includes an image pickup unit and a confirmation unit that displays a picked-up image transmitted from the image pickup unit, the image pickup unit and the confirmation unit being separable from each other, and the image pickup system includes: a first motion determination section that determines a motion of the image pickup unit; and a control section that instructs the image pickup unit to perform continuous shooting based on a determination result by the first motion determination section when the image pickup unit and the confirmation unit are separated from each other.

Furthermore, an image pickup method according to the present invention is an image pickup method of an image pickup system that includes an image pickup unit and a confirmation unit that displays a picked-up image transmitted from the image pickup unit, the image pickup unit and the confirmation unit being separable from each other, and the image pickup method includes: a first motion determination step in which a motion of the image pickup unit is determined; and a control step in which an instruction is given to the image pickup unit to perform continuous shooting based on a determination result in the first motion determination step when the image pickup unit and the confirmation unit are separated from each other.

The above and other objects, features and advantages of the invention will become more clearly understood from the following description referring to the accompanying drawings.

BRIEF DESCRIPTION OF THE DRAWINGS

FIGS. 3A to 3C are illustrative diagrams for describing the working in the first embodiment.

DETAILED DESCRIPTION OF PREFERRED EMBODIMENTS

Hereinafter, detailed description will be made on embodiments of the present invention with reference to drawings.

First Embodiment

Figure 1:
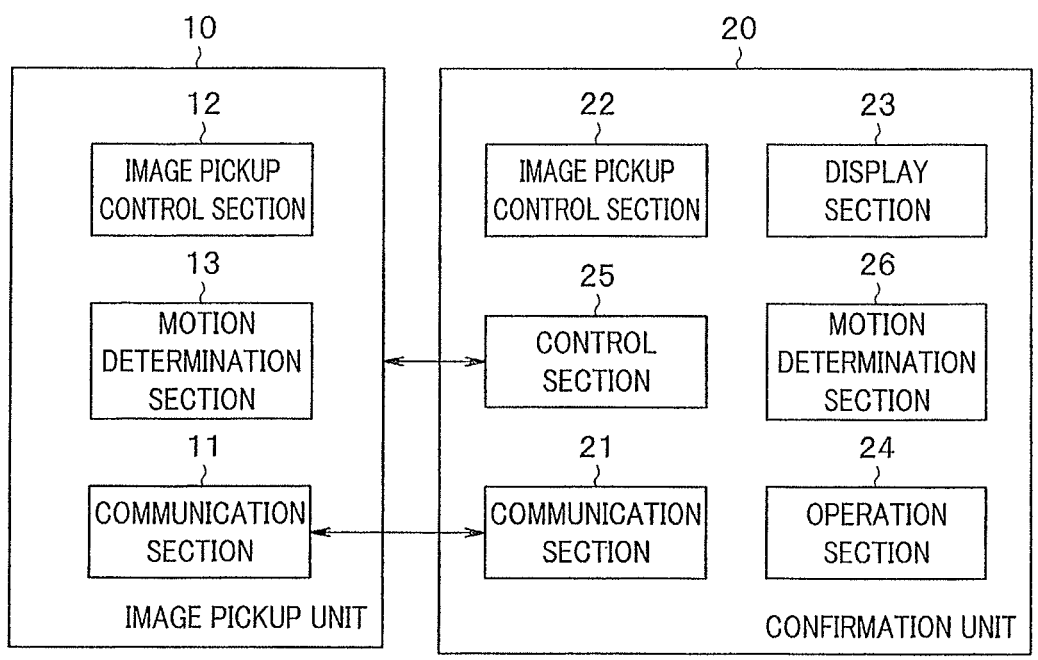
FIG. 1 is a block diagram showing an image pickup system according to a first embodiment of the present invention.

FIG. 1 is a block diagram showing an image pickup system according to the first embodiment of the present invention.

In FIG. 1, an image pickup unit 10 includes a communication section 11, and a confirmation unit 20 includes a communication section 21. For example, the image pickup unit 10 can be configured by a lens-style camera, and the confirmation unit 20 can be configured by a smartphone or a tablet PC. The communication section 11 and the communication section 21 can communicate with each other. The image pickup unit 10 and the confirmation unit 20 communicate with each other through the communication sections 11, 21, to thereby capable of transmitting and receiving various kinds of information. Note that the confirmation unit 20 configured by a smartphone, a tablet PC, or the like not only displays an image from the image pickup unit 10 for confirmation but also operates and controls the image pickup unit 10. Therefore, the confirmation unit 20 may be referred to as "information terminal", "image pickup display apparatus", "operation apparatus", "control apparatus, etc.

The image pickup unit 10 includes an image pickup device, not shown. An image pickup control section 12 is configured to receive a control signal from the confirmation unit 20 through the communication section 11, and to be able to control image pickup to be performed by the image pickup device. The communication section 11 is configured to be able to transmit a picked-up image obtained by the image pickup device to the communication section 21.

In the present embodiment, the image pickup unit 10 is provided with a motion determination section 13. The motion determination section 13 is configured to be able to determine a motion of the image pickup unit 10 and output a determination result to a control section 25 of the confirmation unit 20, through the communication section 11. Note that the motion determination section 13 is configured by an acceleration sensor, a gyro sensor, or the like, and capable of determining the motion of the image pickup unit 10 based on the detection result obtained by any of these sensors. In addition, the motion determination section 13 may be configured to determine the motion of the image pickup unit 10 by detecting the motion of the picked-up image obtained by the image pickup device of the image pickup unit 10.

The confirmation unit 20 includes an image pickup device, not shown. The image pickup control section 22 is configured to be able to control the image pickup by the image pickup device in the confirmation unit 20. The confirmation unit 20 includes a display section 23. The display section 23 is controlled by the control section 25 to display a picked-up image, a menu, and the like.

The control section 25 can control image pickup by the image pickup unit 10 through the communication sections 21, 11. In addition, the control section 25 performs predetermined image processing on the picked-up image transferred from the image pickup unit 10 through the communication sections 11, 21, and thereafter can send the picked-up image subjected to the image processing to the display section 23, to cause the display section to display the picked-up image. The control section 25 also can send the picked-up image from the image pickup unit 10 to a recording medium, not shown, to cause the recording medium to record the image.

The confirmation unit 20 is provided with an operation section 24. The operation section 24 can be configured by switches, buttons, and the like, not shown, for example, and outputs to the control section 25 an operation signal based on a user operation performed with respect to the operation section 24. In addition, a touch panel, not shown, provided on a display screen of the display section 23 may be employed as the operation section 24.

The touch panel can generate an operation signal corresponding to a position on the display screen of the display section 23 which is pointed by the user with a finger. The operation signal is supplied to the control section 25. Thus, when the user touches on or slides the display screen, the control section 25 is capable of detecting various operations, for example, the position touched by the user, operation for closing and then spreading two fingers (pinch operation), the sliding operation, the position reached by the sliding operation, the sliding direction, a time period during which the user touches the display screen, etc., and capable of executing processing corresponding to the user operation. For example, touch operation enables various photographing operations in the image pickup unit 10 to be performed.

In the present embodiment, the confirmation unit 20 is provided with a motion determination section 26. The motion determination section 26 is capable of determining the motion of the confirmation unit 20 itself. The motion determination section 26 outputs a motion determination result to the control section 25. Note that the motion determination section 26 is configured by an acceleration sensor, a gyro sensor, or the like, and capable of determining the motion of the confirmation unit 20 based on the detection result obtained by any of these sensors. Furthermore, the motion determination section 26 may be configured to determine the motion of the confirmation unit 20 by detecting the motion of the picked-up image obtained by the image pickup device of the confirmation unit 20.

Note that the motion determination sections 13, 26 are capable of determining whether the image pickup unit 10 and the confirmation unit 20 are in motion or motionless, various types of the motions, for example, arc-like or rectangular motion, motion surrounding an area, or linear motion, and various matters such as rotation angle, a motion amount, and a motion speed, and the like.

The control section 25 is configured to be able to not only control the confirmation unit 20 and the image pickup unit 10 based on the operation of the operation section 24, but also control the image pickup of the image pickup unit 10 in accordance with the determination result by the motion determination section 13. Note that the control section 25 causes a memory, not shown, to store the motion determination results obtained by the motion determination sections 13, 26. This makes it possible for the control section 25 to control the image pickup of the image pickup unit 10 according to the history of the motion determination.

Note that the control section 25 is configured to be able to determine whether or not the image pickup unit 10 is attached to the confirmation unit 20, that is, the image pickup unit 10 and the confirmation unit 20 are connected to each other, or separated from each other, by using the determination results from the motion determination sections 13, 26, the picked-up images by the image pickup unit 10 and the confirmation unit 20, and the like.

Figure 2:
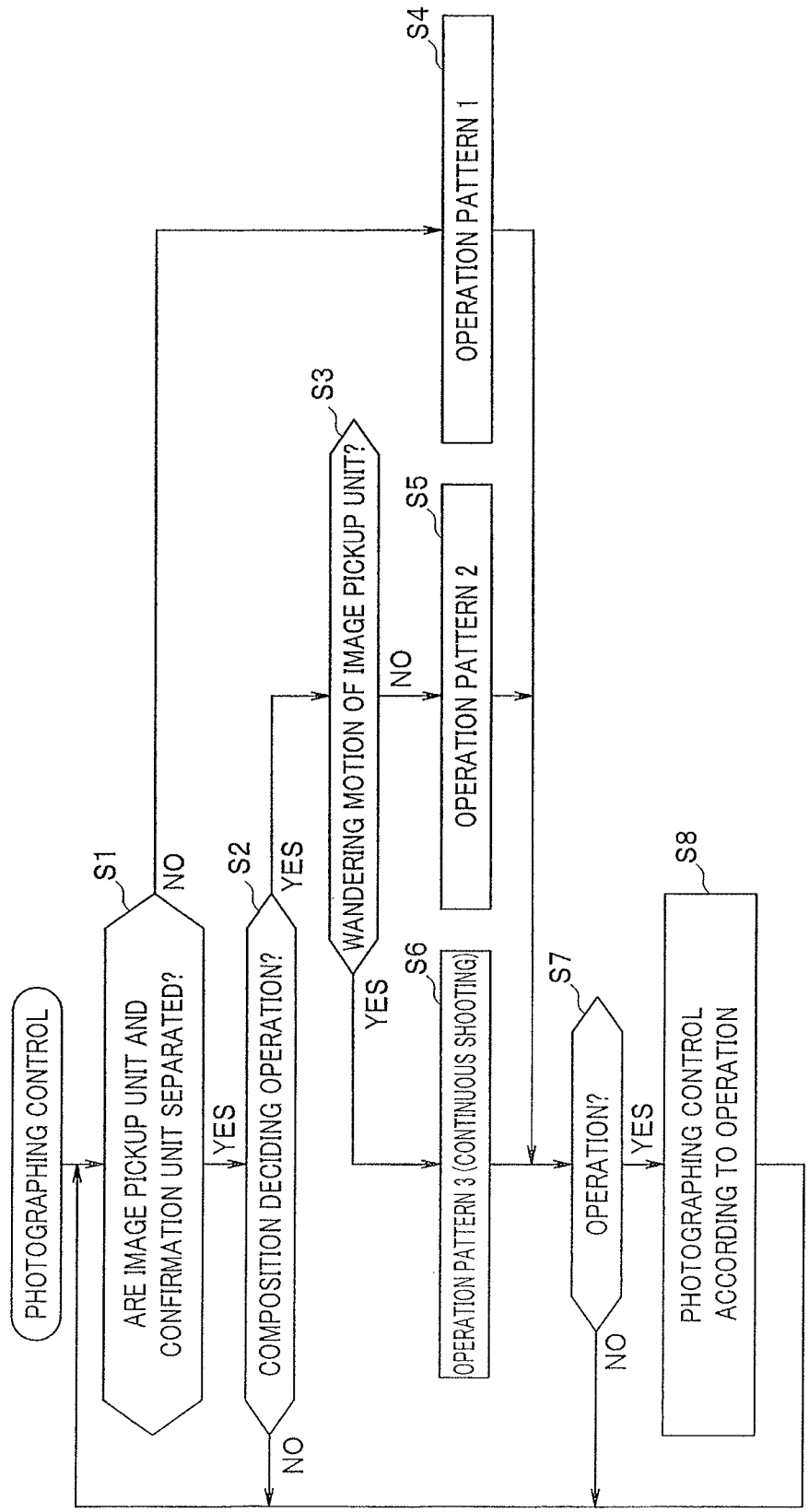
FIG. 2 is a flowchart for describing photographing control.

Next, the working in the embodiment thus configured will be described with reference to FIG. 2 and FIGS. 3A to 3C. FIG. 2 is a flowchart for describing photographing control, and FIGS. 3A to 3C are illustrative diagrams for describing the working in the first embodiment.

The control section 25 of the confirmation unit 20 controls the image pickup control section 12 of the image pickup unit 10, through the communication sections 21, 11. The image pickup control section 12 is controlled by the control section 25 to drive the image pickup device of the image pickup unit 10. The picked-up image obtained by image pickup performed by the image pickup device is imported into the confirmation unit 20 through the communication sections 11, 21. The control section 25 of the confirmation unit 20 performs predetermined signal processing on the imported picked-up image, and thereafter sends the imported picked-up image subjected to the predetermined signal processing to the display section 23 to cause the display section to display a through image. The user can perform photographing operation while referring to the through image displayed on the display section 23. When the user operates the operation section 24 to perform release operation for deciding an image to be recorded from among the picked-up images of the image pickup unit 10, the control section 25 gives a photographing instruction to the image pickup unit 10. In response to this instruction, the image pickup unit 10 outputs the image being picked up as a still image. The control section 25 of the confirmation unit 20 records the transferred picked-up image in a recording medium, not shown.

In the present embodiment, besides the case where the release operation is performed by the user, the control section 25 performs automatic photographing based on the determination result as to whether or not the image pickup unit 10 and the confirmation unit 20 are separated from each other and the determination result of the motion of the image pickup unit 10. In step S1 in FIG. 2, determination is made on whether or not the image pickup unit 10 and the confirmation unit 20 are separated from each other. For example, the control section 25 can determine whether or not the confirmation unit 20 and the image pickup unit 10 are separated from each other, based on the motion determination results obtained by the motion determination sections 13, 26. When the image pickup unit 10 is attached to the confirmation unit 20, i.e., these units are in a connected state, the control section 25 selects a display form for an operation pattern 1 and performs operation control according to the operation pattern 1 (step S4).

FIG. 3A shows a display in the operation pattern 1. FIG. 3A shows a state where the display section 23 is provided on the substantially entire area of an operation surface of a case 20a of the confirmation unit 20. On a display screen 23a of the display section 23, an image display area 31 for displaying a picked-up image 32 is provided. In addition, on the display screen 23a, a play button 35a, a mode button 35b, and a photographing button 35c, which are operation icons constituting the operation section 24, are displayed.

When the user touches on the play button 35a, the mode button 35b, or the photographing button 35c, the control section 25 causes the confirmation unit 20 to shift to a play mode, a mode setting mode, or a photographing mode.

When the image pickup unit 10 is attached to the confirmation unit 20, it is expected that the user usually holds the case 20a with both hands, and as shown in the example in FIG. 3A, the user performs touch operation with both fingers (the thumbs, for example), i.e., both of a finger 41L of the left hand and a finger 41R of the right hand. Since the operation using the fingers of the both hands is possible, the operation icons are arranged in arranging areas at up, down, right and left portions on the display screen 23a, as shown in FIG. 3A.

When the control section 25 determines that the image pickup unit 10 and the confirmation unit 20 are in the state separated from each other, the control section 25 determines, in the next step S2, whether or not a composition deciding operation is performed. For example, the control section 25 determines whether or not the image pickup unit 10 makes a particular movement in the state where the photographer looks at the confirmation unit 20. For example, it is supposed that the photographer grasps and holds the image pickup unit 10 with one hand, and grasps the confirmation unit 20 with the other hand to confirm the display section 23. In this case, the photographer moves the image pickup unit 10 for deciding a composition. For example, when the control section 25 detects that the confirmation unit 20 is in a motionless state and the image pickup unit 10 is moved for deciding a composition and, after the movement, the image pickup unit 10 is in a motionless state for a predetermined time period, based on the determination results obtained by the motion determination sections 13, 26, the control section 25 can determine that the composition determining operation has been completed and the image pickup unit 10 is in a composition fixed state. Note that whether or not the photographer looks at the confirmation unit 20 can be easily confirmed, if confirmation unit 20 includes a built-in camera. In a case where the confirmation unit 20 does not include a built-in camera, or other cases, the determination as to whether or not the photographer is looking at the confirmation unit 20 may be omitted and the composition deciding operation and the composition fixed state may be determined based only on a relationship between the motions of the image pickup unit 10 and the confirmation unit 20. The composition deciding operation is determined based on the motion of the confirmation unit (display section) and the motion of the image pickup unit.

When the composition deciding operation and the composition fixed state are determined based on the motion of the confirmation unit (display section), substantially fixed positional relationship between the confirmation unit and the user may be used as a condition for the composition fixed state, for example, and this condition can be determined by checking directly on an image that the confirmation unit or the display section is at a distance of distinct vision from the user's eyes and the up, down, right, and left sides of the confirmation unit or the display section are maintained at a constant distance with respect to the user's eyes. Alternatively, the state where the confirmation unit or the display section is fixed in a range of hand shake may be used as a condition for the composition fixed state. However, the state where the confirmation unit or the display section is placed face-down on a desk may be excluded from the condition for the composition fixed state.

In addition, the condition for the motion of the image pickup unit may be taken into consideration. In that case, determination may be made as to whether a wandering operation to be described later or confirmation operation is performed. In the composition deciding operation, the display section is substantially fixed so that the user can carefully look at the display section, and in the image pickup unit, confirmation and wandering (composition adjustment) is performed.

When the composition deciding operation is performed, the control section 25 shifts the processing from step S2 to step S3, to determine the wandering motion of the image pickup unit 10. When the image pickup unit 10 and the confirmation unit 20 are in the state separated from each other, it is expected that the line of sight of the photographer who confirms the picked-up image on the display section 23 of the confirmation unit 20 does not coincide with the field of view direction of the image pickup unit 10. In this case, the photographer cannot easily recognize how to move the image pickup unit 10 in order to set a desired field of view range, and is not sure how to move the image pickup unit 10. As a result, in the composition deciding operation, the photographer sometimes continues to move the image pickup unit 10 for a relatively long time, or further moves the image pickup unit 10 despite an object desired to be photographed being captured at a center position of an image, for example, or repeats object searching action many times. In step S3, such motions of the image pickup unit 10 are determined as wandering motion.

For example, when the motion of the image pickup unit 10 indicates that the composition deciding operation is continuously performed for a predetermined time period or more, the control section 25 may determine that such a motion is wandering motion. In addition, for example, when a main object can be determined from the picked-up image and the image position of the determined main object continues to move for a predetermined time period or more, the control section 25 may determine that such a motion is wandering motion.

That is, "wandering motion" includes a situation where the motion for capturing an object image is performed first and the object to be placed in the center portion of the screen has not been fixed. In other words, there is no object which is continuously detected in the screen at first, and after an image of a particular object is picked up, the image pickup unit tries to continue to capture the image of the particular object. Accordingly, a process before the particular object enters into the screen is also regarded as a part of the wandering motion.

Next, the object image entered into the center part of the screen, for example, is expected to move such that confirmation action and feedback action are repeated so that the user confirms the composition and photographing effects. When an image of the same characteristics is captured and there is a confirmation period of about 0.5 seconds (this numerical value is supposedly set, because it is said that it takes 0.4 seconds after a baseball pitcher throws a ball until the ball reaches the home base, and an expert can determine a pitch type during the time period. However, such time period varies between individuals, as a matter of course.) for confirming the image, such a situation is regarded as "wandering motion". If it is supposed that the user does not move the display section and image pickup unit during the confirmation period, the motion pattern in which micro-motion and fixing are repeated in a cycle of about 0.5 to 2 seconds may be regarded as "motion determination" based on a change in a result of image pickup, posture determination, and vibration determination. A method of such "motion determination" will be further detailed later. The motion determination may be performed not only on the center of the screen but also on a particular area. At this time, determination may be made on whether the photographer surely looks at the display section or on whether the photographer does not shake the display section, and such determination may be also set as a condition for the motion determination.

When determining that the wandering motion of the image pickup unit 10 does not occur in step S3, the control section 25 determines that the composition is fixed, to shift the processing to step S5. In the present embodiment, if the confirmation unit 20 moves in the state where the image pickup unit 10 is in a motionless state in the composition fixed state, operation control in a operation pattern 2 is performed according to the motion of the confirmation unit 20 (step S5). For example, when the user performs an operation for rotating the confirmation unit 20 in the composition fixed state, the control section 25 determines that this operation is a zoom operation and performs zoom control on the image pickup unit 10 through the communication sections 21, 11.

FIG. 3B shows a state in the operation pattern 2. FIG. 3B doubly illustrates the case 20a of the confirmation unit 20 and the hand 42 of the user, to show a state where the case 20a is moving. On the display screen 23a, a photographing button 37, which is an operation icon, is displayed in an area other than the image display area 31. When the photographer rotates the confirmation unit 20 as shown with the arrow in FIG. 3B, the control section 25 determines that this movement is a zoom operation. In this case, the control section 25 may determine a zoom direction according to the rotation direction and a zoom amount according to the rotation angle. In addition, as an operation indicating zooming, an operation for rotationally moving the case 20a may be performed while switching the forward and reverse rotation directions. In this case, the control section 25 may determine the zoom direction according to the direction in which the case 20a is rotated first by a predetermined amount or more, and may determine the zoom amount according to the number of forward and reverse rotations.

Note that when the user performs the release operation by touching on the photographing button 37, the control section 25 causes the imported picked-up image to be recorded.

In the case of this display form, it is expected that the user usually holds the case 20a with one hand, and holds the image pickup unit 10 with the other hand. Therefore, it is relatively difficult for the user to perform photographing operation using buttons, switches, and the like. Even in such a case, the operation for moving the confirmation unit 20 is relatively easy, and the user can easily perform the zoom operation as shown in the example shown in FIG. 3B.

In the present embodiment, when determining that the wandering motion has occurred in the step S3, the control section 25 shifts the processing to step S6. FIG. 3C shows an example of the wandering motion. In order to decide the composition, the user moves the image pickup unit 10 while confirming the display on the display section 23 of the confirmation unit 20. FIG. 3C shows that the user rotates a case 10a of the image pickup unit 10 as shown by the arrow in order to photograph the image of the object in a vertical composition or a horizontal composition such that the object is not inclined. In this case, since the image pickup unit 10 has a cylindrical shape, the user has to confirm the vertical composition or the horizontal composition by viewing the through image and the field of view direction of the user and the field of view direction of the image pickup unit 10 do not coincide with each other. As a result, the user cannot decide in which direction the image pickup unit 10 should be rotated in order to decide the composition, which results in occurrence of the wandering motion.

In step S6, the control section 25 gives an instruction for photographing by continuous shooting to the image pickup unit 10 regardless of whether or not the release operation is performed by the user. In response to the instruction, the image pickup control section 12 of the image pickup unit 10 continuously imports the picked-up images from the image pickup device as still images and sequentially transmits the images to the confirmation unit 20. The confirmation unit 20 sequentially records the picked-up images obtained by continuous shooting in a recording medium, not shown.

When the control section 25 detects operations with respect to the displays according to these operation patterns 1 to 3 in step S7, the control section 25 performs photographing control, image processing, and the like which correspond to the operations (step S8).

Note that the control section 25 may record the picked-up images obtained by the image pickup unit 10 as still images by the touch operation of the photographing button 37 shown in FIGS. 3B and 3C, or may detect that both of the image pickup unit 10 and the confirmation unit 20 are in the motionless state for a predetermined time period or more, for example, to thereby automatically record the still images.

In addition, the above-described flowchart in FIG. 2 does not explicitly show that the history of the motions of the image pickup unit 10 and the confirmation unit 20 is utilized. However, the operation pattern may be decided according to not only the relationship between the states of the present motions of the image pickup unit 10 and the confirmation unit 20 but also the history of the motions of the image pickup unit 10 and the confirmation unit 20.

In addition, description has been made supposing that continuous shooting is performed in the step S6. However, control may be performed such that single shooting is performed.

Thus, in the present embodiment, determination is made on whether or not the image pickup unit and the confirmation unit are separated from each other, and in the case where these units are in the separated state, if it is determined that wandering motion occurs in the composition deciding operation, continuous shooting of the object is automatically performed regardless of whether or not the release operation is performed by the user. According to such a configuration, even if the user makes wandering motion in the composition deciding operation of the image pickup unit, the image of the object can be surely picked up. In the state where the image pickup unit and the confirmation unit are separated from each other, the user sometimes moves the image pickup unit many times in the wandering motion so as to search for the object, when performing operation for deciding the composition. Therefore, even if the user can obtain a desired composition, the user sometimes cannot perform release operation at the timing at which the desired composition is obtained. According to the present embodiment, photographing is surely performed even in such a case, which enables the user to obtain a still image with desired composition without missing the best moment for photographing.

Second Embodiment

Figure 4:
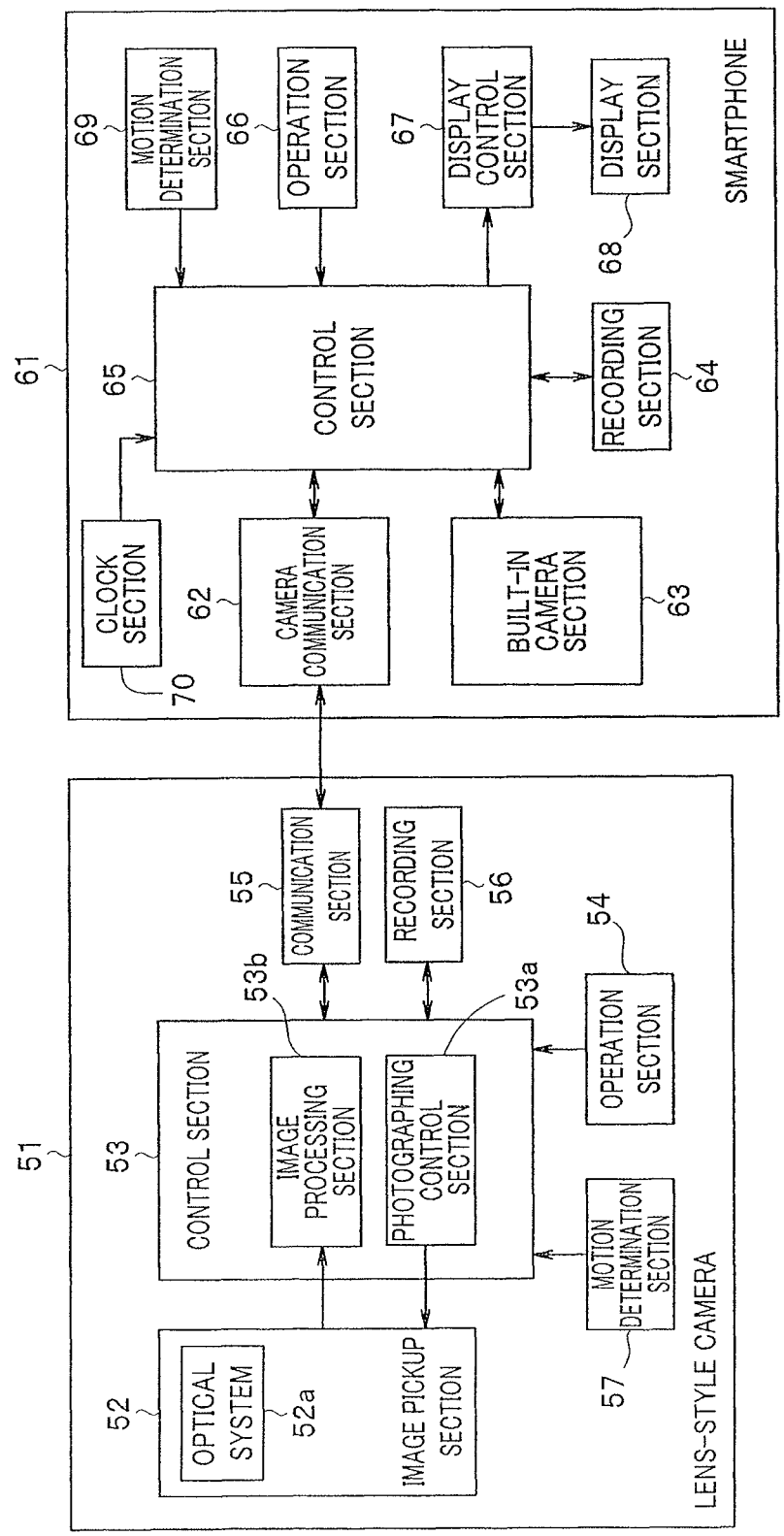
FIG. 4 is a block diagram showing a second embodiment of the present invention.
Figure 5:
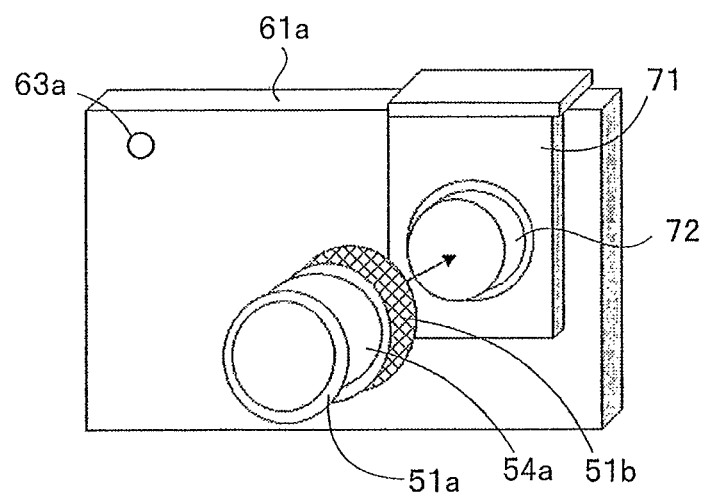
FIG. 5 is an illustrative diagram showing an appearance of the system shown in FIG. 4.

FIG. 4 is a block diagram showing the second embodiment of the present invention and illustrating an example in which a lens-style camera is employed as the image pickup unit and a smartphone is employed as the confirmation unit. FIG. 5 is an illustrative diagram showing an appearance of the system shown in FIG. 4. Note that each of the image pickup unit and the confirmation unit has only to include the image pickup function and the display function, and both of the image pickup unit and the confirmation unit may be configured by smartphones, or tablet PCs, mobile phones, or the like.

In FIG. 4, a smartphone 61 corresponding to the confirmation unit 20 in FIG. 1 is provided with a camera communication section 62, a lens-style camera 51 corresponding to the image pickup unit 10 in FIG. 1 is provided with a communication section 55, and the smartphone 61 and the lens-style camera 51 are configured to be able to communicate with each other through the communication sections 62, 55.

As shown in FIG. 5, a case 61a of the smartphone 61 is configured such that an attaching instrument 71 is detachably attached thereto, and the attaching instrument 71 is provided with an attaching portion 72 for attaching the lens-style camera 51. The lens-style camera 51 includes on a base end side thereof an attaching portion 51b which is configured to be attachable to the attaching portion 72 of the attaching instrument 71 by fitting, screwing, or the like.

The lens-style camera 51 is provided with an image pickup section 52 having an optical system 52a. The image pickup section 52 is provided with an image pickup device, not shown, configured by a CCD, a CMOS sensor, or the like, and an object image is guided onto an image pickup surface of the image pickup device by the optical system 52a. The optical system 52a is housed in a lens barrel 51a, and in the lens barrel 51a, a focus lens which is movable for setting a focus (focusing) state by focusing, a zoom lens whose power is varied in the focus state, and the like are provided. In addition, the optical system 52a includes a mechanical portion, not shown, which drives these lenses and a diaphragm. A control section 53 is configured to control the mechanical portion of the optical system 52a to drive and control the focus lens, zoom lens and diaphragm.

The lens-style camera 51 is provided with an operation section 54 such as an operation ring 54a for performing setting operation of parameters for photographing by a user, for example, parameters related to focusing, zooming and diaphragm. The control section 53 detects the user operation performed on the operation section 54, to perform control based on a result of the detection. The control section 53 is configured by a processor such as a CPU, and controls the respective sections of the lens-style camera 51 based on the user operation performed on the operation section 54 and a signal from the smartphone 61 to be described later.

A photographing control section 53a generates a focus signal, a zoom signal, and a diaphragm control signal, to drive and control the focusing, zooming and diaphragm of the optical system 52a. In addition, the photographing control section 53a supplies a driving signal to the image pickup device to control the image pickup of the object.

An image processing section 53b receives a picked-up image from the image pickup device, and performs predetermined image signal processing, for example, color adjustment processing, matrix conversion processing, noise removal processing, and other various kinds of signal processing on the picked-up image, and thereafter sends the image subjected to the image signal processing to a recording section 56 and enables the recording section to record the image. As the recording section 56, an IC memory can be employed, for example. In addition, the image processing section 53b is configured to be able to transfer the picked-up image to the smartphone 61 through the communication section 55.

The communication section 55 can communicate with the camera communication section 62 provided in the smartphone 61 through a predetermined transmission channel. As the transmission channel, various wired and wireless transmission channels, for example, a USB (Universal Serial Bus) cable, a transmission channel for wireless LAN such as Wifi (Wireless Fidelity) can be employed. When communication is established between the lens-style camera 51 and the smartphone 61, the control section 53 is able to control the photographing in accordance with the control by the control section 65 of the smartphone 61 and transfer the picked-up image and information related to the lens to the smartphone 61.

In the present embodiment, the lens-style camera 51 is provided with a motion determination section 57. The motion determination section 57 is configured by a three-axis acceleration sensor, a gyro sensor, or the like, and determines the motion of the lens-style camera 51 to send a result of the determination to the control section 53. Note that, the motion determination section 57 may use a geomagnetic sensor together with the above-described sensor. Note that the motion determination section 57 may be configured to detect the motion of the picked-up image obtained by the image pickup section 52, to thereby determine the motion of the lens-style camera 51.

The smartphone 61 includes a built-in camera section 63. The built-in camera section 63 includes two image pickup devices, not shown, configured by CCD, CMOS sensor and the like, and these two image pickup devices configure an outside image pickup section and an inside image pickup section. The outside image pickup section includes one of the image pickup devices. An optical image of an object, which is incident through a lens 63a (see FIG. 5) provided on a front surface of the case 61a of the smartphone 61, is guided onto the image pickup surface of the one of the image pickup devices, and the outside image pickup section picks up the image of the object. The inside image pickup section includes the other of the image pickup devices. An optical image of the photographer himself/herself, which is incident through a lens, not shown, provided on the operation surface of the case 61a of the smartphone 61, is guided onto the image pickup surface of the other of the image pickup devices, and the inside image pickup section picks up the image of the photographer himself/herself.

The control section 65 of the smartphone 61 is configured by a processor such as a CPU, for example, and controls the respective sections of the smartphone 61. The control section 65 controls the built-in camera section 63 and outputs a signal for driving the image pickup section 52 of the lens-style camera 51. The control section 65 receives a picked-up image from the built-in camera section 63, and also receives a picked-up image from the lens-style camera 51. The control section 65 performs predetermined signal processing, for example, color adjustment processing, matrix conversion processing, noise removal processing, and other various kinds of signal processing on the picked-up image from the built-in camera section 63 and the picked-up image received from the lens-style camera 51.

The smartphone 61 is also provided with an operation section 66. The operation section 66 is configured by various kinds of operation portions such as switches, keys, software keyboard, or the like, which are not shown, provided to the smartphone 61, and configured to generate an operation signal based on a user operation, and output the generated operation signal to the control section 65. The control section 65 controls each of the sections based on the operation signal.

The control section 65 is capable of performing processing related to recording and playing of the picked-up image. For example, the control section 65 is capable of performing compression processing on the picked-up image subjected to the signal processing, transmitting the compressed image to a recording section 64, and causing the recording section to record the image. As the recording section 64, various kinds of recording media such as an IC memory can be employed, and the recording section 64 is capable of recording image information, voice information, and the like in the recording medium.

A display control section 67 executes various kinds of processing related to display. The display control section 67 receives the picked-up image subjected to the signal processing from the control section 65, and is capable of sending the received image to a display section 68. The display section 68 has a display screen such as an LCD, and displays the image received from the display control section 67. Furthermore, the display control section 67 enables various kinds of menus to be displayed on the display screen of the display section 68. The control section 65 is capable of reading the picked-up image recorded in the recording section 64 and performing expansion processing on the read picked-up image. The display control section 67 sends the picked-up image subjected to the expansion processing to the display section 68, thereby capable of playing the recorded image.

Also a touch panel, not shown, is provided as the operation section 66 on the display screen of the display section 68. The touch panel is capable of generating an operation signal corresponding to a position on the display screen indicated by the user with a finger. The operation signal is supplied to the control section 65. Thus, when the user touches on or slides the display screen, the control section 65 is capable of detecting various operations, for example, the position touched by the user, operation for closing and then spreading two fingers (pinch operation), the sliding operation, the position reached by the sliding operation, the sliding direction, a time period during which the user touches the display screen, etc., and capable of executing processing corresponding to the user operation.

Note that the display section 68 is disposed so as to cover the substantially entire area of the operation surface of the smartphone 61, for example, and the user is capable of confirming the picked-up image displayed on the display screen of the display section 68 at the time of photographing with the lens-style camera 51, and performing photographing operation while confirming the picked-up image.

In addition, in the present embodiment, the smartphone 61 is provided with a motion determination section 69. The motion determination section 69 is configured by a three-axis acceleration sensor, a gyro sensor, or the like, and determines the motion of the smartphone 61, to send a result of the determination to the control section 65. Note that, the motion determination section 69 may use a geomagnetic sensor together with the above-described sensor. Note that the motion determination section 69 may be configured to detect the motion of the picked-up image obtained by the built-in camera section 63, to thereby determine the motion of the smartphone 61.

The control sections 53, 65 are capable of determining whether the lens-style camera 51 and the smartphone 61 are connected to or separated from each other, based on information on the motion determination result from the motion determination section 69 and the motion determination result of the lens-style camera 51 received from the lens-style camera 51 through the camera communication section 62. Furthermore, the control sections 53, 65 are capable of determining whether or not the wandering motion of the lens-style camera 51 occurs when the composition deciding operation is performed, based on the motion determination result from the motion determination section 57 of the lens-style camera 51. When determining that the wandering motion of the lens-style camera 51 has occurred, the control section 65 gives an instruction for continuous shooting to the lens-style camera 51 regardless of whether or not the release operation is performed by the user. When the control section 53 receives the instruction for continuous shooting from the control section 65 or determines that the wandering motion of the lens-style camera 51 has occurred, the control section 53 causes the photographing control section 53a to perform continuous shooting regardless of whether or not the release operation is performed by the user. Note that the connection determination and the wandering motion determination may be made by one of the control sections 53 and 65.

Figure 6:
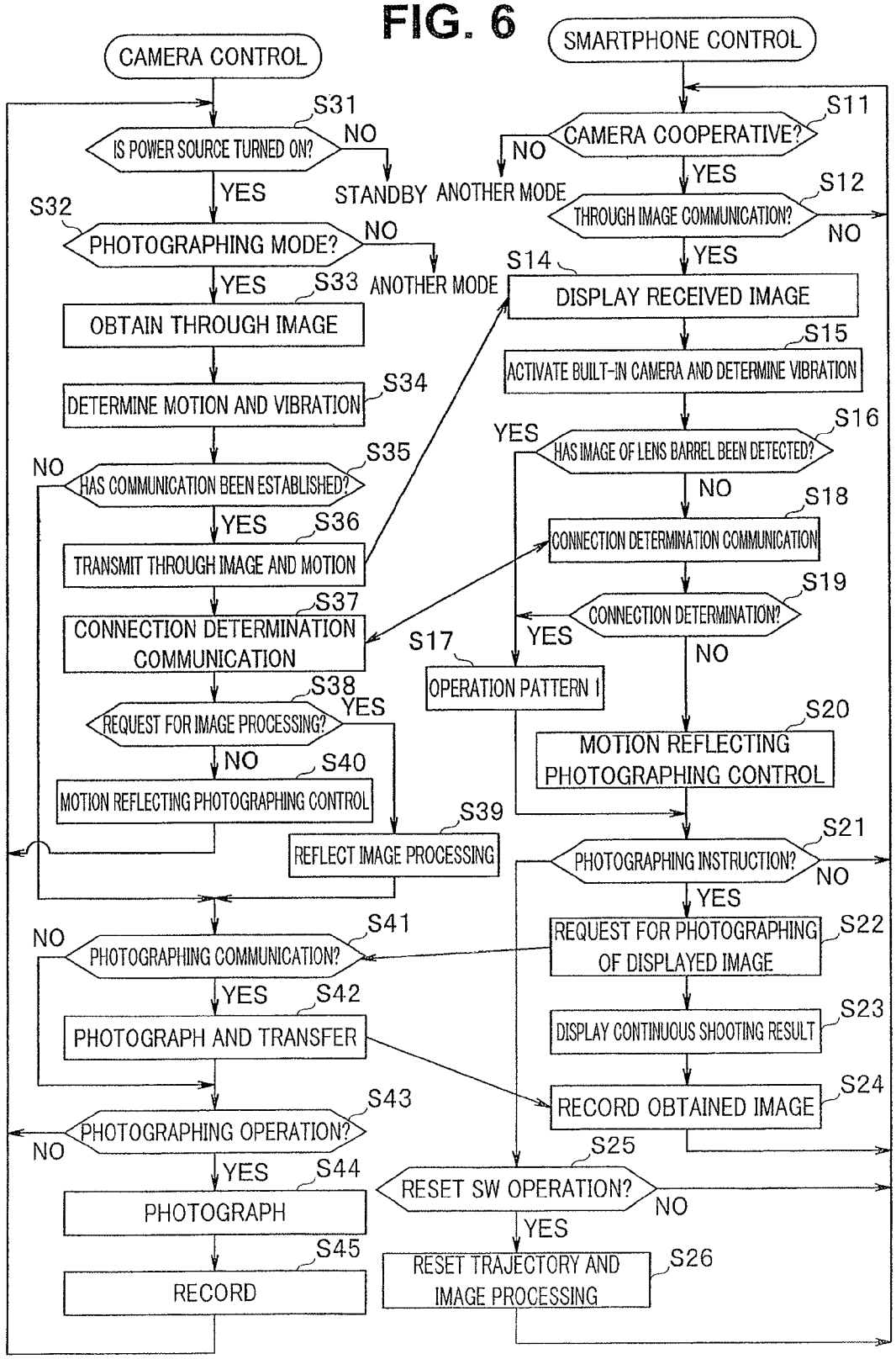
FIG. 6 is a flowchart for describing the camera control in the lens-style camera 51 and the control of a smartphone 61.

Next, description will be made on the working of the embodiment thus configured with reference to FIGS. 6 to 16. FIG. 6 is a flowchart for describing the camera control in the lens-style camera 51 and the control of a smartphone 61. Note that, in FIG. 6, each of the arrows connecting the camera control flow of the lens-style camera 51 and the control flow of the smartphone 61 indicates that communication is performed by processing.

The control section 53 of the lens-style camera 51 determines whether or not the power source is turned on in step S31. When the power source is turned on, the control section 53 determines whether or not the photographing mode is specified (step S32). When the photographing mode is specified, the control section 53 controls the image pickup section 52 to cause the image pickup section to pick up the image of the object. The picked-up image obtained by the image pickup section 52 is imported by the control section 53 and a through image is obtained (step S33). In addition, the control section 53 obtains the motion determination result from the motion determination section 57 in step S34. Note that, in the step S34, a determination result of vibration of the lens-style camera 51 is also obtained for connection determination to be described later.

On the other hand, the control section 65 of the smartphone 61 determines, in step S11, whether or not a camera cooperative mode is specified. When the camera cooperative mode is specified, the control section 65 communicates with the lens-style camera 51 and generates a request for receiving a through image from the lens-style camera 51 in step S12.

Upon receiving the request for the through image from the smartphone 61, the control section 53 of the lens-style camera 51 establishes communication in step S35, and thereafter transmits the through image to the smartphone 61 through the communication section 15 (step S36). In the step S36, also the motion determination result obtained in the step S34 is transmitted to the smartphone 61. The control section 65 of the smartphone 61 receives the through image from the lens-style camera 51, sends the received through image to the display control section 67 to cause the display control section to display the through image in step S14.

Next, the control section 65 determines whether or not the smartphone 61 and the lens-style camera 51 are connected to each other for photographing operation determination. For example, the control section 65 activates the built-in camera section 63 and performs vibration determination using the output from the motion determination section 69 in step S15. Next, in step S16, the control section 65 detects whether or not an image of a lens barrel constituting the lens-style camera 51 is included in the picked-up image from the built-in camera section 63. When the lens barrel image is included, the control section 65 determines that the lens-style camera 51 is in the connected state, and sets the operation pattern 1 (step S17).

Figure 7:
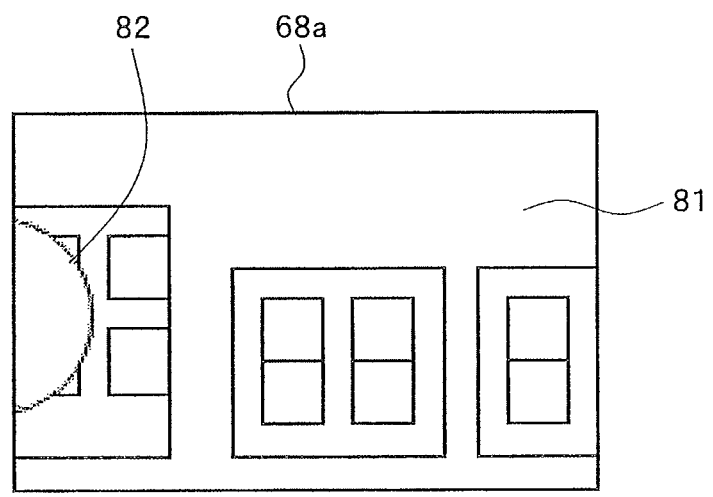
FIG. 7 is an illustrative diagram showing an example of a picked-up image from the built-in camera section 63.

FIG. 7 is an illustrative diagram showing an example of the picked-up image from the built-in camera section 63. FIG. 7 shows a state where a picked-up image 81 obtained by the built-in camera section 63 is displayed on the display screen 68a of the display section 68. A lens barrel image 82 is included in the end portion of the picked-up image 81. An image of the lens barrel 51a of the lens-style camera 51 is sometimes picked up by the built-in camera section 63 depending on the attaching position of the lens-style camera 51, the position of the lens 63a, and the like. The control section 65 detects whether or not the barrel image 82 is included in the picked-up image by image processing, and when the lens barrel image 82 is included in the picked-up image, the control section 65 can determine that the lens-style camera 51 is attached (connected) to the smartphone 61. Note that it is not necessary to perform display in FIG. 7 in this determination processing.

Furthermore, when the lens barrel image is not included in the picked-up image, the control section 65 cannot determine whether or not the lens-style camera 51 is in the connected state based only on the picked-up image from the built-in camera section 63. Therefore, the control section 65 performs communication for connection determination with respect to the lens-style camera 51 in step S18. Also the lens-style camera 51 performs communication for connection determination in step S37.

Figure 8:
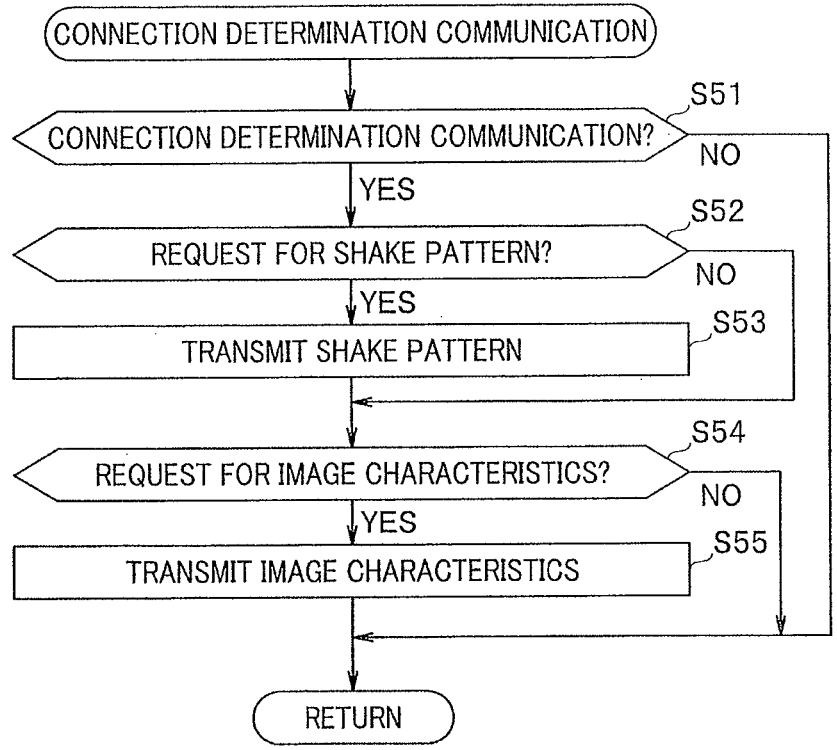
FIG. 8 is a flowchart showing an example of a specific working flow of a connection determination communication performed by the lens-style camera 51 in step S37 in FIG. 6.

FIG. 8 is a flowchart showing an example of a specific working flow of a connection determination communication performed by the lens-style camera 51 in step S37 in FIG. 6. Furthermore, FIG. 9 is a flowchart showing a flow of the connection determination performed by the control section 65 using information obtained by the connection determination communication.

The control section 53 of the lens-style camera 51 determines whether or not a request for connection determination communication is generated in step S51 in FIG. 8, and determines whether or not the generated request is a request for shake pattern in step S52. When determining that the request for shake pattern is generated, the control section 53 transmits information on the shake pattern which is information on vibration of the lens-style camera 51 based on the output from the motion determination section 57 (step S53).

Figure 9:
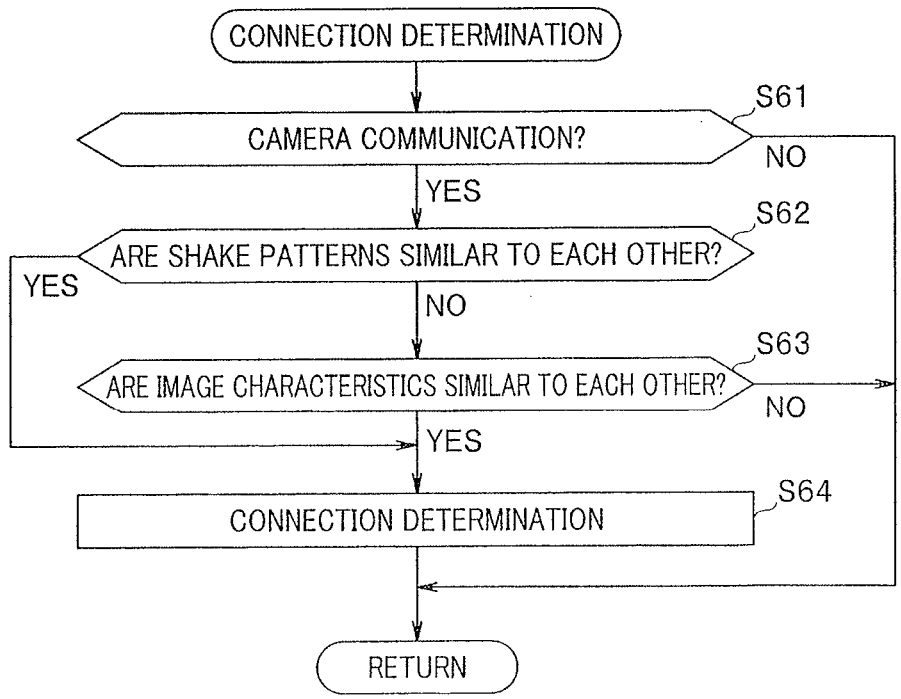
FIG. 9 is a flowchart showing a flow of a connection determination performed by a control section 65 using information obtained by the connection determination communication.

On the other hand, the control section 65 of the smartphone 61 determines a presence or absence of the camera communication between the smartphone 61 and the lens-style camera 51 in step S61 in FIG. 9, to receive information on the shake pattern from the lens-style camera 51. The control section 65 determines similarity between the received shake pattern and the vibration determination result (shake pattern) of the smartphone 61 obtained in the step S15, and when determining that the shake patterns are similar to each other, the control section 65 shifts the processing to step S64 and when determining that there is no similarity, the control section 65 shifts the processing to step S63.

Figures 10A, 10B:
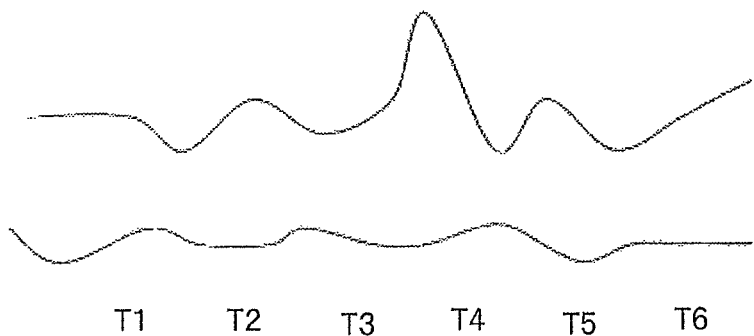
FIG. 10A and FIG. 10B are illustrative diagrams for describing similarity determination of shake patterns.

FIG. 10A and FIG. 10B are illustrative diagrams for describing the similarity determination of the shake patterns. FIG. 10A shows the shake pattern of the lens-style camera 51, and FIG. 10B shows the shake pattern of the smartphone 61. The control section 65 calculates changes in values of the respective shake patterns for each of the timings T1, T2, . . . in FIG. 10A and FIG. 10B, for example. The control section 65 determines whether or not the changes are similar to each other. When the changes of the both shake patterns are similar to each other, the control section 65 determines that the lens-style camera 51 is connected to the case 61a of the smartphone 61 (step S64). In addition, when the changes of the both shake patterns are not similar to each other, the control section 65 shifts the processing to the step S63. In the step S63, the control section 65 requests transmission of image characteristics of the picked-up image obtained by the lens-style camera 51.

The control section 53 of the lens-style camera 51 determines whether or not the request for the image characteristics has been generated in step S54 in FIG. 8. When the request for the image characteristics has been generated, the control section 53 transmits information on the image characteristics to the smartphone 61 in step S55.

When receiving the information on the image characteristics from the lens-style camera 51, the control section 65 determines similarity between the received information on the image characteristics and information on image characteristics acquired from the picked-up image obtained with the built-in camera section 63. When the information on these image characteristics are similar to each other, the control section 65 determines that the field of view of the lens-style camera 51 is similar to that of the built-in camera section 63, and the lens-style camera 51 is connected to the case 61a of the smartphone 61 (step S64). When determining that there is no similarity in the shake patterns and in the image characteristics, the control section 65 determines that the lens-style camera 51 is not connected to the case 61a of the smartphone 61.

When determining the connection in the step S19 in FIG. 6, the control section 65 shifts the processing to the step S17 to set the operation pattern 1, and when determining that there is no connection, the control section 65 shifts the processing to the step S20. In the operation pattern 1 in the step S17 in FIG. 6, the display and the operation control shown in FIG. 3A are performed, for example. On the other hand, in the step S20, photographing control in which the motions of the lens-style camera 51 and the smartphone 61 are reflected is performed.

Figure 11:
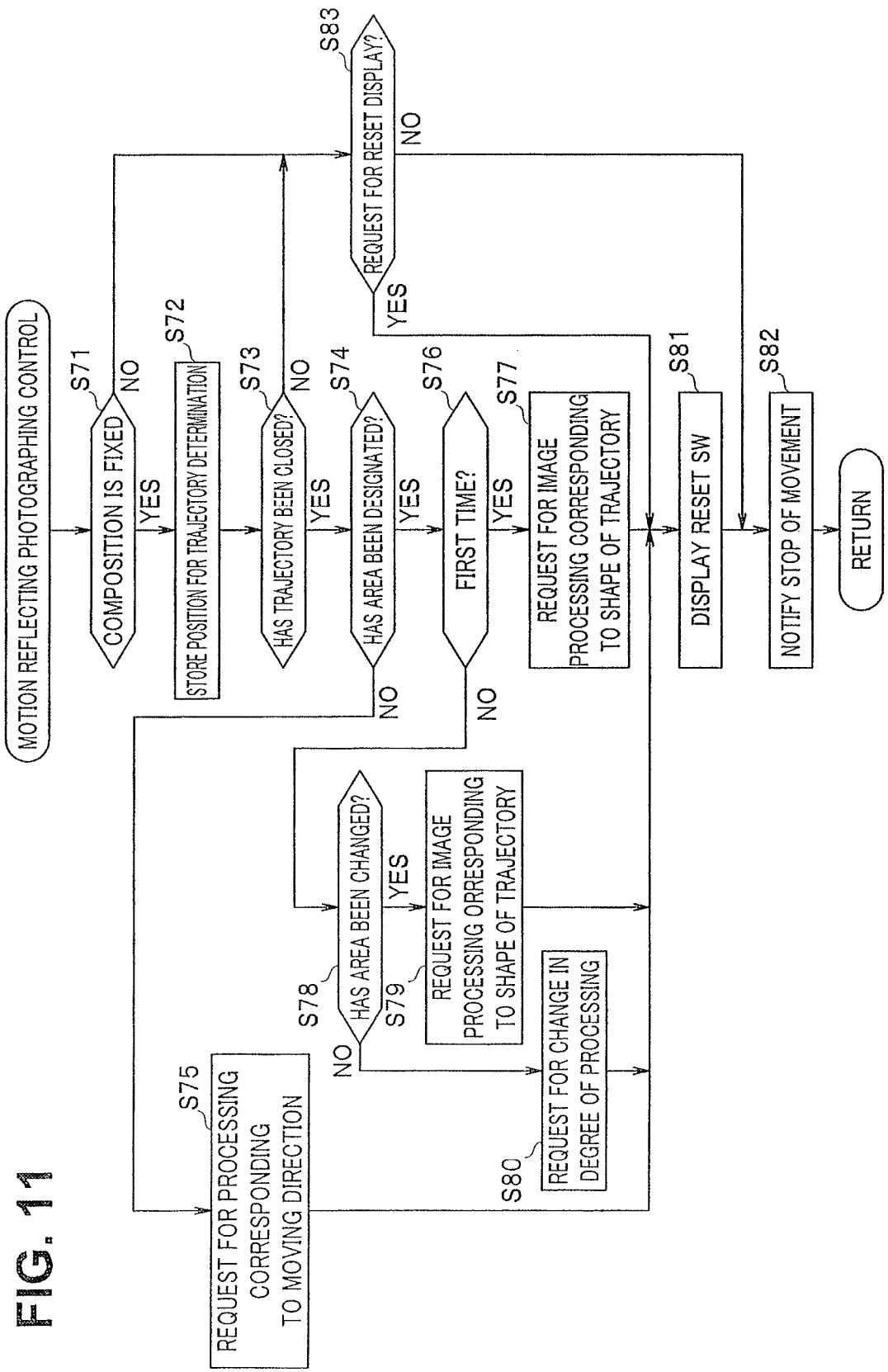
FIG. 11 is a flowchart showing the working of motion reflecting photographing control in step S20 in FIG. 6.
Figure 12:
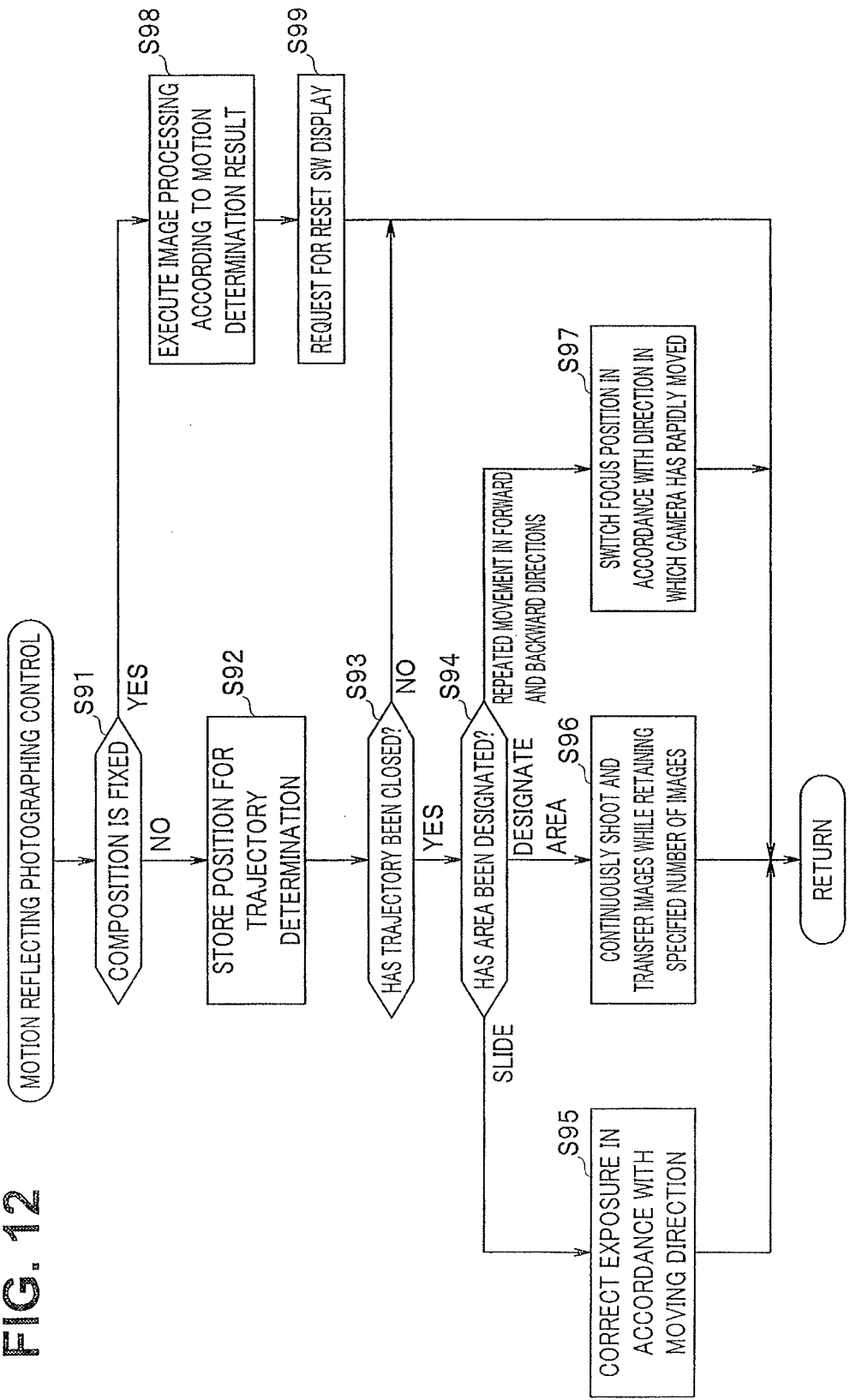
FIG. 12 is a flowchart showing the working of motion reflecting photographing control in step S40 in FIG. 6.

FIG. 11 is a flowchart showing the working of the motion reflecting photographing control in step S20 in FIG. 6. In addition, FIG. 12 is a flowchart showing the working of the motion reflecting photographing control in step S40 in FIG. 6. Note that, in the examples shown in FIG. 11 and FIG. 12, determination of the wandering motion is performed only in the control section 53 of the lens-style camera 51. However, such determination may be made in the control section 65 of the smartphone 61. FIGS. 13A,13B and FIGS. 14A, 14B are illustrative diagrams for describing photographing control corresponding to FIG. 11, and FIGS. 15A to 15D are illustrative diagrams for describing photographing control corresponding to FIG. 12.

In recent years; automatic control technique of cameras has been developed, and exposure and focus, other than composition, are entrusted to cameras. Therefore, after the composition and the like are fixed to some degree, various kinds of image effects may be set so as to be controlled in accordance with the motions of the lens-style camera 51 and the smartphone 61. FIG. 11 shows an example of working flow of the case where such control in accordance with the motions is employed in the image processing.

Figure 13A:
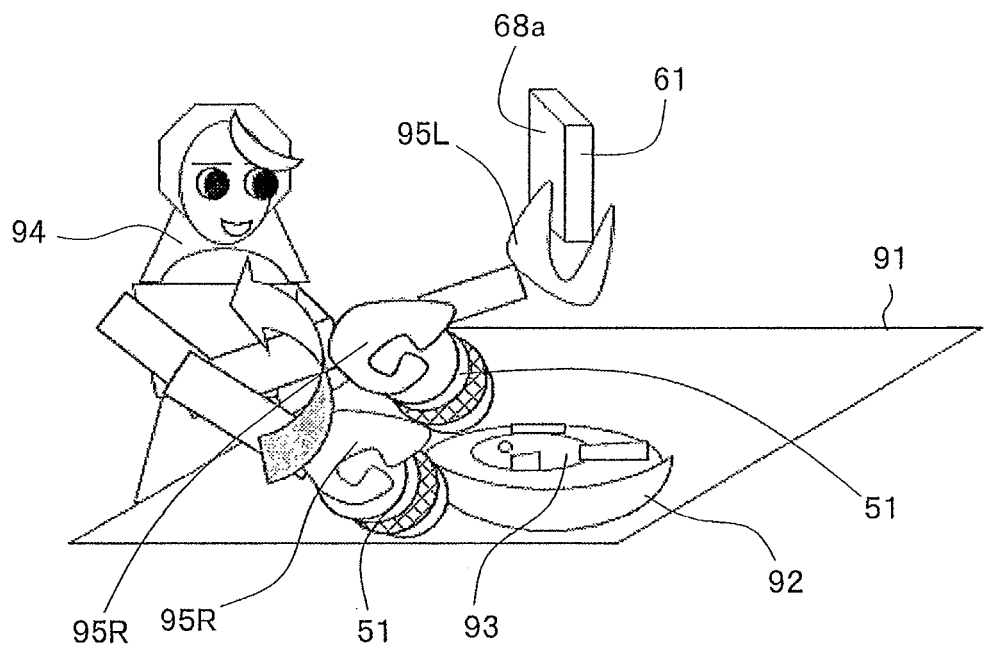
FIG. 13A and FIG. 13B are illustrative diagrams for describing photographing control corresponding to FIG. 11.
Figure 13B:
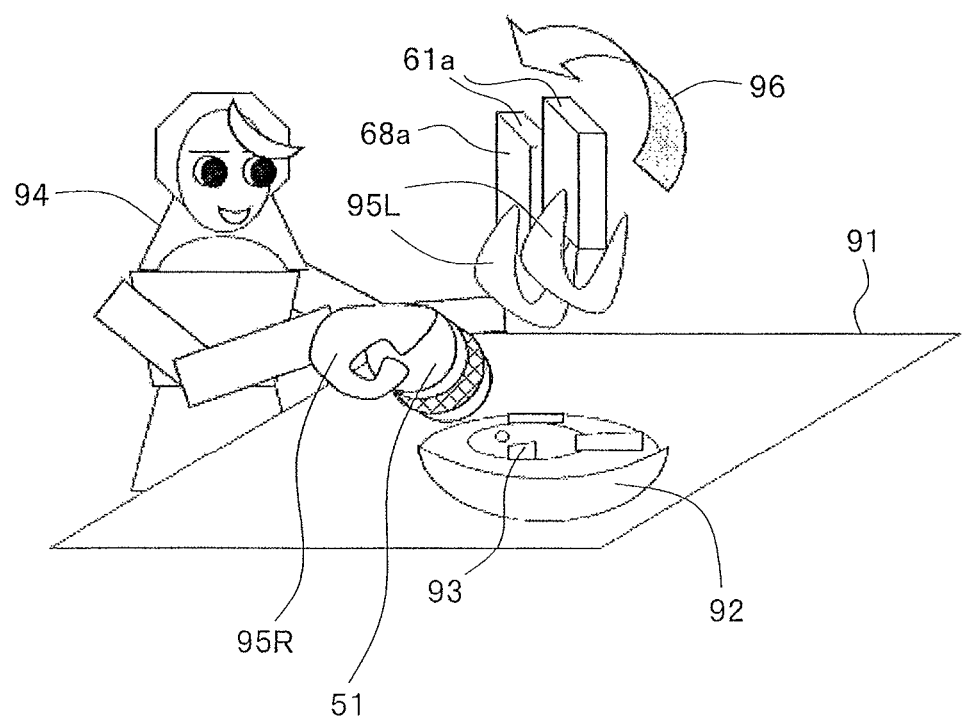

The lens-style camera 51 has an advantage in that the photographer does not have to move in accordance with the lens-style camera 51 to decide the composition, since the lens-style camera 51 can be used in the state separated from the smartphone 61. In photography, it is important which object is arranged in which size at which position within a photographing range. Even if the photographer aims at an object from various angles with the lens-style camera 51, the photographer can confirm the effects as long as the photographer holds the smartphone 61 in front of his or her eyes. Therefore, depending on photographing situations, it is sometimes greatly advantageous to use the image pickup unit and an observation unit at which the picked-up image is observed in the separated state. When an image of a dish is photographed, for example, the position of the photographer is restricted in some cases. Therefore, it is extremely effective to use the image pickup unit and the observation unit in the separated state. FIGS. 13A and 13B show an example of such photographing of a dish. Note that FIG. 13A and FIG. 13B doubly illustrate the hands, the lens-style camera 51, the smartphone 61, and the like, to show a state where they are moving.

The control section 65 determines whether or not the composition is fixed in step S71 in FIG. 11. For example, in the case where the through image obtained by the lens-style camera 51 is stable and the orientation of the display screen 68a of the smartphone 61 is constant, the control section 65 determines that the composition has already been fixed. In addition, the control section 65 may determine that the composition has been fixed when a predetermined time period has elapsed after the stop of the motion of the lens-style camera 51, based on the motion determination result by the motion determination section 57 of the lens-style camera 51, for example.

FIG. 13A shows how to decide the composition. In the examples shown in FIGS. 13A and 13B, a serving plate 92 is placed on a table 91, and a fish dish 93 is put on the serving plate 92. A user 94 holds the lens-style camera 51 with a right hand 95R and holds the smartphone 61 with a left hand 95L. The user 94 decides the composition while moving the right hand 95R which holds the lens-style camera 51 as shown by the arrow, for example. The user 94 can confirm the through image displayed on the display screen 68a of the smartphone 61. The user 94 decides the composition by appropriately moving the right hand 95R while confirming the through image.

Figure 14A:
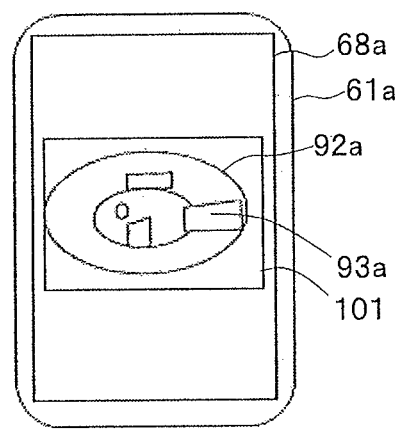
FIG. 14A and FIG. 14B are illustrative diagrams for describing photographing control corresponding to FIG. 11.

FIG. 14A illustrates the through image displayed on the display screen 68a of the display section 68 of the smartphone 61 when the composition is fixed. As shown in FIG. 14A, a display area 101 for the through image is provided on the display screen 68a, and an image 92a corresponding to the serving plate 92 and an image 93a corresponding to the fish dish 93 are displayed in the display area.

Figure 14B:
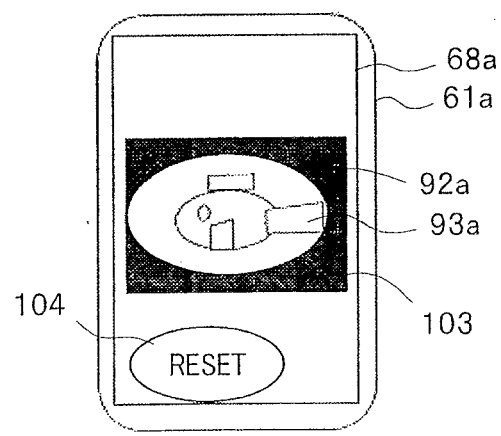

The flow in FIG. 11 shows steps for performing image processing for gradating the portion surrounding the image 93a of the dish as shown in FIG. 14B with respect to the picked-up image shown in FIG. 14A by the operation for moving the smartphone 61 in the state where the lens-style camera 51 is in the motionless state.

That is, according to the present invention, "composition deciding operation" (in which the wandering motion may be included) can be determined based on the information on the respective motions of the image pickup unit and the confirmation unit, and if the image pickup unit is fixed after the determination of such "composition deciding operation", it is supposed that the user desires to perform the next operation, and the user's intension is acknowledged based on the analysis of motion data, to allow the motion of the display side to be utilized as input information of the user's intension.

The control section 65 stores a position for trajectory determination in a memory, not shown, in step S72, in order to decide the range of image processing, for example, the range of gradation processing. In order to decide the range of the image processing (gradation processing), the user rotates the case 61*a* of the smartphone 61 after the fixing of the composition. The control section 65 acquires the trajectory of the movement of the smartphone 61 to determine whether or not the smartphone has returned to the original position by the rotation operation by the user 94, and whether or not the trajectory has been closed. When determining that the smartphone has returned to the original position by the rotation operation by the user 94, the control section 65 determines, in the next step S74, whether the determined trajectory shows an area of circular, elliptical or polygonal shape, or shows a linear movement.

When the moving operation of the smartphone 61 by the user causes the smartphone to move linearly, the control section 65 shifts the processing to step S75 to request the lens-style camera 51 to perform processing set in advance in accordance with the moving direction. This request is transmitted to the control section 53 of the lens-style camera 51 through the communication sections 62, 65. When the control section 53 of the lens-style camera 51 detects, in step S38 in FIG. 6, that a request for image processing is generated, the control section 53 performs image processing according to the request (step S39).

Note that FIG. 11 shows an example in which various kinds of image processing are executed in the lens-style camera 51. However, it is apparent to perform all of or a part of the various kinds of image processing may be executed in the smartphone 61.

When the moving operation of the smartphone 61 by the user is an operation for designating an area, the control section 65 shifts the processing to step S76 to determine whether or not the designation of the area is the first time. If the designation of the area is the first time, the control section 65 requests the lens-style camera 51 to perform image processing corresponding to the shape of the trajectory in step S77. The lens-style camera 51 executes the requested image processing, and transfers the image obtained as a result of the execution of the image processing to the smartphone 61. As a result, an image 103 subjected to the image processing as shown in FIG. 14B is displayed on the display screen 68*a* of the smartphone 61.

For example, the control section 65 reflects the shape of the trajectory, and sets the outside and inside of the trajectory as a target for image processing. Note that the control section 65 may give variety to the image processing with respect to the normal direction of the trajectory. The example in FIG. 14B shows that the gradation processing shown with filling is applied to the surrounding area of the image 92*a* of the serving plate by the user rotationally operating the smartphone 61 in an elliptical manner.

The control section 65 performs image processing in a shape similar to the actual trajectory formed by the smartphone 61 being moved by the user. Actually, since the user is unable to know in advance that the trajectory of which size should be formed to cause image processing to be performed in an area of desired size, it is expected for the user to decide the desired area for the image processing by repeating rotational movement of the smartphone while viewing the image on the display screen 68*a*.

When the control section 65 determines that the designation of the area is the second time or more in step S76, the control section 65 determines whether or not the area has been changed in step S78. When the area has been changed, the control section 65 requests the lens-style camera 51 to perform image processing in an area corresponding to a shape and a size of a new trajectory in step S79. For example, the control section 65 generates a request in which the position of the border, size, shape and the like of the area of the image processing have been changed. The lens-style camera 51 executes the requested image processing, and transfers the image obtained as a result of the execution of the image processing to the smartphone 61. As a result, an image 103 obtained as result of the corrected image processing based on the new area is displayed on the display screen 68*a* of the smartphone 61.

Note that, when the area is not changed by the moving operation by the user in step S78, the control section 65 determines that the moving operation by the user is a request for a change in the degree of the image processing, and transmits a request for image processing corresponding to the number of times of designation of the area to the lens-style camera 51 in step S80. For example, it is considered to perform control for increasing the density of the gradation processing according to the number of times of the user's operation for designating the area. The lens-style camera 51 executes the requested image processing, and transfers the image obtained as a result of the execution of the image processing to the smartphone 61. As a result, the image 103 after the image processing in which the degree of image processing has been changed is displayed on the display screen 68*a* of the smartphone 61.

Note that FIG. 11 shows an example in which the area of the image processing is decided based on the trajectory formed by the user's rotation operation. However, in view of the case where the user cannot set a desired area of the image processing due to trembling of hand or the like, a particular area of the image processing may be decided according to a particular motion of the user.

The control section 65 displays a reset switch (SW) in step S81. FIG. 14B shows the state where the reset SW 104 is displayed. The control section 65 determines whether or not the reset SW has been operated in step S25 in FIG. 6. When the user touches the position of the reset SW 104, the control section 65 resets the detected trajectory and transmits a request for resetting the image processing to the lens-style camera 51 (step S26). When receiving the request for the reset processing in step S38, the lens-style camera 51 executes the reset processing to transfer the original image before the image processing to the smartphone 61. Then, the image before the image processing is displayed on the display screen 68*a* of the smartphone 61. When the motion of the smartphone 61 is stopped, the control section 65 notifies that the movement of the smartphone is stopped in step S82.

When the control section 65 determines that the composition is not fixed in the step S71 and the trajectory is not closed in step S73, the control section 65 accepts the reset display request from the lens-style camera 51 in the step S83. Also the control section 53 of the lens-style camera 51 is capable of independently executing the image processing according to the motion of the user without being controlled by the smartphone 61. In this case, if the reset request is not accepted by the smartphone 61, the image processing cannot be reset. Therefore, the control section 65 is configured to accept the reset display request in step S83. When the reset display request is generated, the control section 65 displays the reset SW 104 in the step S81.

The control section 53 of the lens-style camera 51 also determines whether or not photographing has been instructed by the operation performed through the operation section 54 of the lens-style camera 51 (step S43). When photographing is instructed by the operation section 54, the control section 53 performs photographing in step S44 to cause the recording section 56, for example, to record the picked-up image (step S45).

In addition, the control section 53 of the lens-style camera 51 is capable of independently performing photographing control such as image processing without being controlled by the smartphone 61. If the control section 53 does not receive the request for image processing in the step S38, the control section 53 performs motion reflecting photographing control in step S40.

FIG. 12 shows the processing in the step S40, and illustrates the flow including, as the motion reflecting photographing control, the processing of determining the wandering motion to perform continuous shooting.

First, the control section 53 determines whether or not the composition has been fixed in step S91 in FIG. 12. For example, the control section 53 may be configured to receive a control signal indicating the completion of the composition deciding processing from the smartphone 61, to determine the completion of the composition deciding processing. Note that the control section 65 of the smartphone 61 is capable of determining whether the motion of the lens-style camera 51 is the motion for deciding the composition or the operation after the composition has been fixed, based on the determination result obtained by the motion determination section 57 of the lens-style camera 51. For example, since the speed of the motion at the time of deciding the composition is relatively slow, on the other hand, the speed of the motion for photographing operation after the fixing of the composition is relatively high, the control section 65 is capable of determining the motion at the time of deciding the composition and the motion after the composition has been fixed. In addition, when the motion of the smartphone 61 is stopped and the lens-style camera 51 is moving, for example, the control section 53 may determine that the composition deciding operation is still being performed.

When determining that the composition has been fixed, the control section 53 shifts the processing to step S98, to execute image processing according to the motion determination results obtained by the motion determination sections 57, 67. For example, the control section 53 may perform the image processing in the same method as that in FIG. 11. The control section 53 transmits a request for displaying the reset SW to the smartphone 61 in step S99. Upon receiving the request for displaying the reset SW, the smartphone 61 displays the reset SW on the display screen 68a to accept the reset operation from the user. According to such operation, the image processing executed independently in the lens-style camera 51 can be reset in the smartphone 61.

When the control section 53 of the lens-style camera 51 determines that the composition has not been fixed, the control section 53 stores in step S92 a position for trajectory determination in a memory, not shown, in order to determine the wandering motion. Next, the control section 53 acquires the trajectory of the movement of the lens-style camera 51 based on the determination result obtained by the motion determination section 57, to determine whether or not the lens-style camera has returned to the original position by the moving operation of the lens-style camera 51 by the user 94 and whether or not the trajectory has been closed (step S93). When determining that the lens-style camera 51 has returned to the original position by the moving operation by the user 94, the control section 53 determines in the next step S94 that the determined trajectory shows an area of circular, elliptical, or polygonal shape, etc., or linear movement.

When the moving operation of the lens-style camera 51 by the user causes the lens-style camera 51 to move linearly, the control section 53 shifts the processing to step S95, to perform processing set in advance in accordance with a moving direction, for example, exposure correction in accordance with the moving direction. Furthermore, when determining that the moving operation of the lens-style camera 51 by the user causes the lens-style camera to repeatedly move in forward and backward directions, the control section 53 shifts the processing to step S97, to perform control for changing the focus position in accordance with the direction in which the user rapidly moves the lens-style camera 51. The control section 53 transfers the image subjected to the image pickup processing in step S95 and step S97 to the smartphone 61.

When the moving operation of the lens-style camera 51 by the user is an operation for designating an area, the control section 53 shifts the processing to step S96, to control the photographing control section 53a to perform continuous shooting processing. For example, when the user aims at an object from various angles with the lens-style camera 51 which is separated from the smartphone 61, as shown in the examples of photographing of the dish in FIG. 13A, 13B, the user 94 views the display screen 68a, which means that the direction in which the user 94 views is different from the photographing direction of the lens-style camera 51 held by the user. In such a case, it is difficult for the user to intuitively recognize how to move the lens-style camera 51 to acquire a desired composition.

Figure 15B:
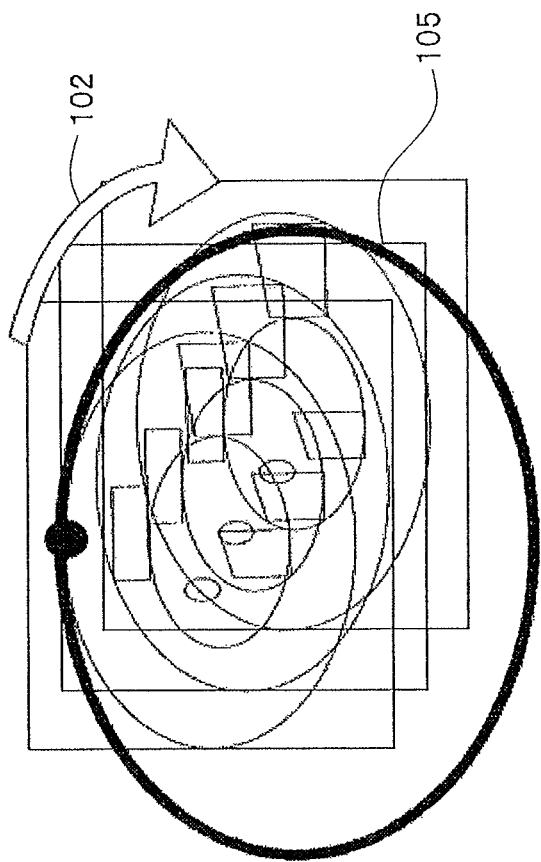
FIGS. 15A to 15D are illustrative diagrams for describing photographing control corresponding to FIG. 12.
Figure 15A:
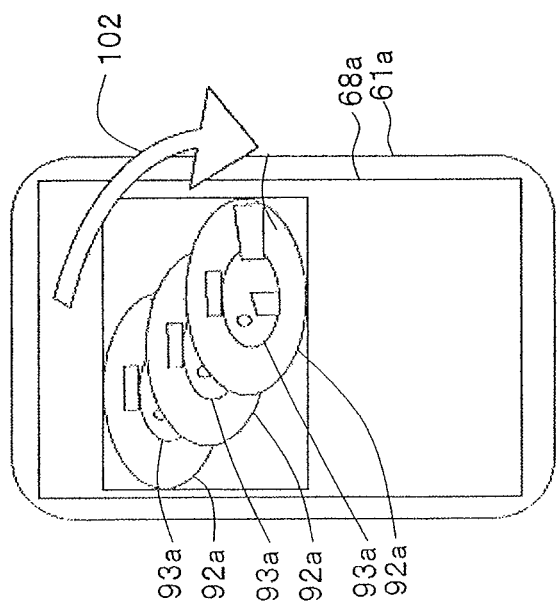

FIG. 15A shows the state illustrated in FIG. 13A, that is, the through image displayed on the display screen 68a of the smartphone 61 at the time of composition deciding operation. FIG. 15A illustrates the image 92a of the serving plate and the image 93a of the fish dish in multiple layers, to show that the images are moving in the direction shown by the arrow 102. Since the user 94 tries to decide the composition while viewing the image on the display screen 68a, the user hesitates how to move the lens-style camera 51 to decide the composition. As a result, as shown in FIG. 15B, for example, the lens-style camera 51 traces a trajectory 105 which returns to the original position, while moving in an arc-like manner in the direction shown with the arrow 102.

Figure 15C:
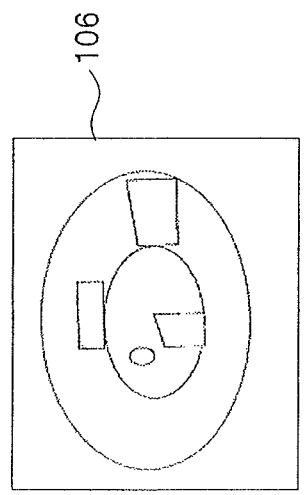
Figure 15D:
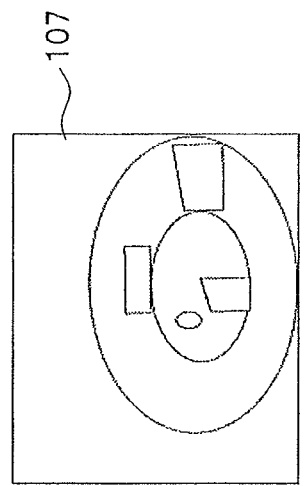

When determining that the movement of the lens-style camera 51 is an operation for tracing the trajectory which forms an area, the control section 53 determines that the user has made a wandering motion, to perform continuous shooting regardless of whether or not the release operation is performed by the user 94. Such a configuration prevents the photographing timing in a desired composition from being missed, which enables secure photographing. FIGS. 15C, 15D show picked-up images 106, 107 obtained by continuous shooting. Since the user makes the wandering motion, the position of the object varies in the picked-up images 106 and 107.

Note that the control section 53 may determine, as the wandering motion, not only the case where the movement of the lens-style camera 51 forms a completely closed area but also the case where the movement of the lens-style camera 51 traces an almost-closing trajectory. The continuous shooting control performed by the photographing control section 53a causes photographing to be continuously performed, and thereby the picked-up images can be continuously acquired.

In step S21 in FIG. 6, the control section 65 determines whether or not the instruction for photographing has been given by the user. When the photographing operation has been performed, the control section 65 requires the lens-style camera 51 to photograph the image displayed on the display section 68 (step S22). The control section 53 of the lens-style camera 51 determines whether or not the communication for instructing the photographing has been performed in step S41, and transfers the picked-up images or the images subjected to the image processing to the smartphone 61 in response to the instruction from the control section 65 of the smartphone 61 (step S42).

When the picked-up images transferred from the lens-style camera 51 are those obtained in response to the release operation performed by the user, the control section 65 sends the picked-up image from the lens-style camera 51 to the recording section 64 to cause the recording section to record the picked-up images in step S24. In addition, when the picked-up images transferred from the lens-style camera 51 are a plurality of images obtained by continuous shooting in the step S96 in FIG. 12, the control section 65 performs display processing of the continuous shooting images in the step S23.

Figure 16:
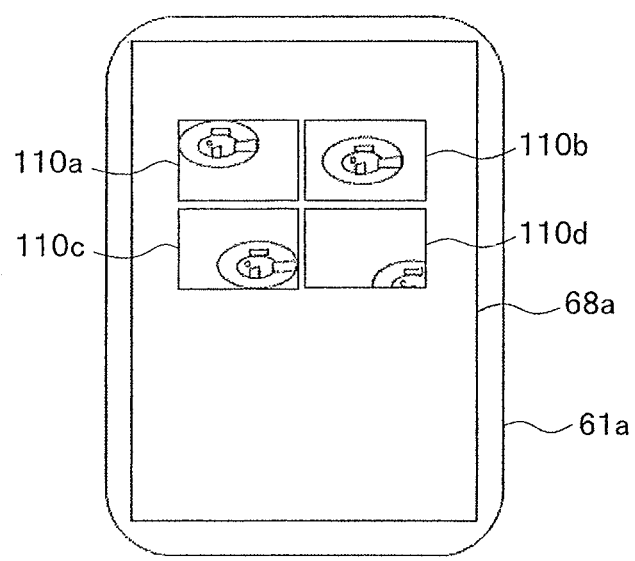
FIG. 16 is an illustrative diagram for describing display processing in step S23 in FIG. 6.

FIG. 16 is an illustrative diagram for describing the display processing in the step S23 in FIG. 6. In the continuous shooting processing, the user moves the lens-style camera 51 in the wandering motion as described above. Therefore, the position of the object varies in the continuously picked-up images. FIG. 16 shows that a series of four picked-up images 110a to 110d obtained by continuous shooting are displayed in a reduced manner on the display screen 68a of the smartphone 61. The position of the object differs in each of the picked-up images 110a to 110d. The control section 65 may send all of these picked-up images 110a to 110d to the recording section 64 to cause the recording section to record the picked-up images in step S24. In addition, the control section 65 may send an image selected by the user from among the picked-up images 110a to 110d to the recording section 64 to cause the recording section to record the image in the step S24. When the wandering motion of the lens-style camera 51 thus occurs, photographing is performed regardless of the release operation by the user, which enables the images of the object to be surely recorded.

Thus, in the present embodiment, determination is made on whether or not the lens-style camera and the smartphone are in the separated state, and when in the separated state, determination is made on whether or not the movement of the lens-style camera is the wandering motion such as tracing of the trajectory which forms a closed area. When the movement is determined as the wandering motion, continuous shooting is performed regardless of the release operation by the user. Therefore, even if the user moves the lens-style camera in the wandering motion in order to decide the angle of view, photographing is surely performed. In addition, since continuous shooting is performed, even when the user continues the wandering motion, photographing in which the user's intention is reflected is likely to be performed while surely capturing the object. Such a configuration enables photographing in the user's desired composition to be performed without missing the photo opportunity.

That is, the present invention provides an image pickup apparatus which includes an image pickup unit which picks up an image of an object, a confirmation unit configured independently from the image pickup unit and configured to confirm a result of the image pickup, composition deciding operation determination sections (these are composed of programs for motion determination) which determine composition deciding operation based on information on the respective motions of the image pickup unit and the confirmation unit, and operation determination sections (these are also composed of programs for motion determination) which determine a particular motion of the confirmation unit as image pickup parameter changing operation when the image pickup unit is substantially fixed after the composition deciding operation determination. According to such an image pickup apparatus, it is possible to decide the composition and perform image pickup parameter control (including continuous shooting and image processing) in seamless manner, thereby enabling the user's intended observation and photographing to be easily performed.

Furthermore, in each of the embodiments of the present invention, description has been made by taking the digital camera as an example of the device for photographing. However, it is needless to say that the camera may be a lens-style camera, a digital single-lens reflex camera, a compact digital camera, a camera for moving picture such as a video camera and a movie camera, and also may be a camera built in a mobile information terminal (PDA: Personal Digital Assist) such as a mobile phone and a smartphone. Furthermore, the camera may be an industrial or medical optical device such as an endoscope or a microscope, or a monitoring camera, a car-mounted camera, or a stationary camera, for example, a camera attached to a television, a personal computer, or the like. It is needless to say that the present invention can be applied to an observation apparatus and an examination apparatus which observe various objects from various angles. When examination or observation is performed, it is more convenient if a plurality of devices can be mechanically connected or separated, or a way of holding the devices can be changed, depending on an object to be observed or examined. Therefore, the present invention can be utilized in wide variety of fields.

The present invention is not limited to each of the embodiments as it is, but can be embodied by modifying constituent elements in the practical stage within a range without departing from the gist of the invention. Furthermore, various inventions can be formed by appropriately combining the plurality of constituent elements disclosed in each of the embodiments. For example, among all of the constituent elements shown in the embodiments, some constituent elements may be removed. Furthermore, the constituent elements from different embodiments may be appropriately combined.

Note that, in the claims, specification, and working flows in the drawings, even if description is made by using the expressions "first", "next" and the like, for convenience sake, it does not mean that processing steps have to be executed in this order. In addition, needless to say, each of the steps constituting the working flow may be appropriately omitted regarding the part which does not affect the essential part of the invention.

In addition, among the techniques described above, many of the controls and functions described mainly in the flowcharts can be set by a program, and the above-described controls and functions can be executed by reading and executing the program by a computer. The entirety or a part of such a program can be recorded or stored as a computer program product in a portable medium such as a flexible disk, CD-ROM and a nonvolatile memory, or a storage medium such as a hard disk and a volatile memory, and can be distributed or provided at the time of product shipment or through a portable medium or telecommunications line. A user can easily realize the image pickup system and image pickup method according to the embodiments by downloading the program through a communication network to install the program into a computer, or by installing the program from a recording medium into a computer.

What is claimed is:
1. An image pickup system comprising:
   an image pickup unit that picks up images, the image pickup unit comprising a first motion determination section that determines a motion of the image pickup unit;
   a confirmation unit separable from the image pickup unit comprising:
      a communication section that receives a picked-up image transmitted from the image pickup unit;
      a display that displays the picked up image transmitted from the image pickup unit; and
      a control section that instructs the image pickup unit to perform continuous shooting when a determination result by the first motion determination section indicates that the image pickup unit has moved continuously for a first predetermined time period and when the image pickup unit and the confirmation unit are separated from each other, the continuous shooting continuing until the image pickup unit is in a motionless state for a second predetermined time period.
2. The image pickup system according to claim 1, wherein the confirmation unit further comprises:
   a second motion determination section that determines a motion of the confirmation unit, wherein
   the control section determines whether or not the motion of the image pickup unit is a motion during a deciding action of a composition based on determination results by the first and second motion determination sections, and instructs the image pickup unit to perform continuous shooting based on the determination result by the first motion determination section during the deciding action of the composition.
3. The image pickup system according to claim 1, wherein
   the first motion determination section is capable of determining the motion of the image pickup unit based on a motion of a picked-up image obtained by image pickup by the image pickup unit, and
   the control section instructs the image pickup unit to perform continuous shooting when the determination result by the first motion determination section indicates that a position of an image of an object in the picked-up image continuously moves for a third predetermined time period or more.
4. The image pickup system according to claim 2, wherein
   the first motion determination section is capable of determining the motion of the image pickup unit based on a motion of a picked-up image obtained by image pickup by the image pickup unit, and
   the control section instructs the image pickup unit to perform continuous shooting when the determination result by the first motion determination section indicates that a position of an image of an object in the picked-up image continuously moves for a third predetermined time period or more.
5. The image pickup system according to claim 1, wherein the control section instructs the image pickup unit to perform continuous shooting when the determination result by the first motion determination section indicates that the motion of the image pickup unit is a motion for forming a predetermined area.
6. The image pickup system according to claim 2, wherein the control section instructs the image pickup unit to perform continuous shooting when the determination result by the first motion determination section indicates that the motion of the image pickup unit is a motion for forming a predetermined area.
7. The image pickup system according to claim 1, wherein the confirmation unit is capable of displaying a series of picked-up images obtained by the continuous shooting.
8. The image pickup system according to claim 2, wherein the confirmation unit is capable of displaying a series of picked-up images obtained by the continuous shooting.
9. An image pickup method of an image pickup system that includes an image pickup unit and a confirmation unit that displays a picked-up image transmitted from the image pickup unit, the image pickup unit and the confirmation unit being separable from each other, the image pickup method comprising:
   a first motion determination step in which a motion of the image pickup unit is determined by the image pickup unit;
   a communication step that transmits a pick-up image from the image pickup unit to the confirmation unit;
   a display step that that displays the picked up image transmitted from the image pickup unit on a display of the confirmation unit; and
   a control step in which an instruction is given to the image pickup unit to perform continuous shooting when a determination result in the first motion determination step indicates that the image pickup unit has moved continuously for a first predetermined time period and when the image pickup unit and the confirmation unit are separated from each other, the continuous shooting continuing until the image pickup unit is in a motionless state for a second predetermined time period.
10. The image pickup method according to claim 9, wherein the confirmation unit further comprises:
    a second motion determination step in which a motion of the confirmation unit is determined, wherein
    in the control step, determination is made on whether or not the motion of the image pickup unit is a motion during a deciding action of a composition based on determination results in the first and second motion determination steps, and an instruction is given to the image pickup unit to perform continuous shooting based on the determination result in the first motion determination step during the deciding action of the composition.
11. The image pickup system according to claim 9, wherein the continuous shooting is automatically performed regardless of whether a manual image-pickup operation is performed.
12. The image pickup system according to claim 1, wherein the continuous shooting is automatically performed regardless of whether a manual image-pickup operation is performed.
13. An image pickup system comprising:
    an image pickup unit that picks up images, the image pickup unit comprising a first motion determination section that determines a motion of the image pickup unit;
    a confirmation unit separable from the image pickup unit comprising:
       a communication section that receives a picked-up image transmitted from the image pickup unit; and
       a display that displays the picked up image transmitted from the image pickup unit;
    a control section that instructs the image pickup unit to initiate continuous shooting when a determination result by the first motion determination section indi- cates that the image pickup unit has moved continuously and the image pickup unit and the confirmation unit are separated from each other, the continuous shooting continuing until the image pickup unit is in a motionless state for a predetermined time period.

* * * * *